(12) United States Patent
Bhargava et al.

(10) Patent No.: US 10,771,144 B2
(45) Date of Patent: Sep. 8, 2020

(54) CONCURRENT USES OF NON-CELLULAR INTERFACES FOR PARTICIPATING IN HYBRID CELLULAR AND NON-CELLULAR NETWORKS

(71) Applicant: M87, Inc., Austin, TX (US)

(72) Inventors: Vidur Bhargava, Austin, TX (US); Peter Matthew Feldman, Austin, TX (US)

(73) Assignee: M87, INC., Austin, TX (US)

( * ) Notice: Subject to any disclaimer, the term of this patent is extended or adjusted under 35 U.S.C. 154(b) by 0 days.

(21) Appl. No.: 15/202,451

(22) Filed: Jul. 5, 2016

(65) Prior Publication Data

US 2016/0315688 A1  Oct. 27, 2016

Related U.S. Application Data

(60) Continuation of application No. 14/264,314, filed on Apr. 29, 2014, now Pat. No. 9,414,434, which is a (Continued)

(51) Int. Cl.
*H04B 7/155* (2006.01)
*H04L 29/06* (2006.01)
(Continued)

(52) U.S. Cl.
CPC ......... *H04B 7/15507* (2013.01); *H04B 7/00* (2013.01); *H04L 69/00* (2013.01); *H04L 69/18* (2013.01); *H04W 4/50* (2018.02); *H04W 24/02* (2013.01); *H04W 28/06* (2013.01); *H04W 76/00* (2013.01); *H04W 76/16* (2018.02); *H04W 88/04* (2013.01); *H04W 84/047* (2013.01); *H04W 88/06* (2013.01)

(58) Field of Classification Search
CPC ..... H04B 7/2606; H04B 7/155; H04W 88/04; H04W 16/26; H04W 84/047
See application file for complete search history.

(56) References Cited

U.S. PATENT DOCUMENTS 6,137,796 A   10/2000 Derango et al.
7,099,283 B2   8/2006 Matta et al.
(Continued)

FOREIGN PATENT DOCUMENTS

CN   102893642 A   1/2013
DE   10309228 B4   9/2005
(Continued)

OTHER PUBLICATIONS

U.S. Appl. No. 15/103,815 Office Action dated Jan. 22, 2018.
(Continued)

*Primary Examiner* — Zhiren Qin
(74) *Attorney, Agent, or Firm* — Wilson Sonsini Goodrich & Rosati

(57) ABSTRACT

The subject matter describes software, devices, networks, and methods to configure a non-cellular interface of a wireless device to establish two or more wireless links in a hybrid of cellular network and a non-cellular network. The advantage of concurrent uses of non-cellular interfaces maximizes the use of computing and communication resources to perform multi-hop communication and to expand the coverage of cellular networks.

18 Claims, 20 Drawing Sheets

Related U.S. Application Data division of application No. 14/092,446, filed on Nov. 27, 2013, now Pat. No. 8,743,758.

(51) Int. Cl.

| | |
|---|---|
| *H04W 24/02* | (2009.01) |
| *H04B 7/00* | (2006.01) |
| *H04W 28/06* | (2009.01) |
| *H04W 4/50* | (2018.01) |
| *H04W 76/16* | (2018.01) |
| *H04W 76/00* | (2018.01) |
| *H04W 88/04* | (2009.01) |
| *H04W 84/04* | (2009.01) |
| *H04W 88/06* | (2009.01) |

(56) References Cited

U.S. PATENT DOCUMENTS

| | | | |
|---|---|---|---|
| 7,352,729 | B2 | 4/2008 | Fujiwara et al. |
| 8,089,970 | B2 | 1/2012 | Ramprashad et al. |
| 8,743,758 | B1 | 6/2014 | Bhargava et al. |
| 2002/0058502 | A1 | 5/2002 | Stanforth |
| 2002/0091921 | A1 | 7/2002 | Kunzinger |
| 2002/0136183 | A1 | 9/2002 | Chen et al. |
| 2003/0145229 | A1 | 7/2003 | Cohen et al. |
| 2003/0235174 | A1 | 12/2003 | Pichna et al. |
| 2004/0023652 | A1 | 2/2004 | Shah et al. |
| 2004/0033778 | A1 | 2/2004 | Fonseca et al. |
| 2004/0166853 | A1 | 8/2004 | Takeda et al. |
| 2004/0192288 | A1 | 9/2004 | Vishwanath |
| 2005/0002364 | A1 | 1/2005 | Ozer et al. |
| 2005/0025178 | A1 | 2/2005 | Shirota et al. |
| 2005/0208966 | A1 | 9/2005 | David et al. |
| 2006/0009201 | A1 | 1/2006 | Gallagher et al. |
| 2006/0156392 | A1 | 7/2006 | Baugher et al. |
| 2006/0159053 | A1 | 7/2006 | Donovan |
| 2007/0041345 | A1 | 2/2007 | Yarvis et al. |
| 2007/0189221 | A1 | 8/2007 | Isobe et al. |
| 2007/0264932 | A1 | 11/2007 | Suh et al. |
| 2008/0065888 | A1 | 3/2008 | Zheng et al. |
| 2008/0188177 | A1 | 8/2008 | Tan et al. |
| 2008/0222250 | A1 | 9/2008 | Datta et al. |
| 2008/0316970 | A1 | 12/2008 | Choi |
| 2009/0088070 | A1 | 4/2009 | Aaron |
| 2009/0092075 | A1 | 4/2009 | Corson et al. |
| 2009/0303034 | A1 | 12/2009 | Abedi |
| 2010/0138661 | A1 | 6/2010 | Tsai et al. |
| 2010/0226336 | A1 | 9/2010 | Ng et al. |
| 2010/0293598 | A1* | 11/2010 | Collart ............. H04N 21/64753 726/3 |
| 2010/0299519 | A1 | 11/2010 | Xiao et al. |
| 2010/0332831 | A1 | 12/2010 | Shon et al. |
| 2011/0126015 | A1 | 5/2011 | Shon et al. |
| 2011/0249609 | A1 | 10/2011 | Brusilovsky et al. |
| 2011/0255511 | A1 | 10/2011 | Ikeda |
| 2012/0214445 | A1 | 8/2012 | Stojanovski et al. |
| 2012/0233656 | A1 | 9/2012 | Rieschick et al. |
| 2013/0083722 | A1 | 4/2013 | Bhargava et al. |
| 2013/0104207 | A1 | 4/2013 | Kroeselberg et al. |
| 2013/0137469 | A1 | 5/2013 | Schmidt et al. |
| 2013/0223329 | A1 | 8/2013 | Jain et al. |
| 2013/0242783 | A1 | 9/2013 | Horn et al. |
| 2013/0267223 | A1* | 10/2013 | Tajima ................... H04W 76/19 455/423 |
| 2013/0295921 | A1* | 11/2013 | Bhargava .............. H04W 48/20 455/426.1 |
| 2013/0339724 | A1 | 12/2013 | Amit et al. |
| 2014/0213269 | A1 | 7/2014 | Nama et al. |
| 2015/0148022 | A1 | 5/2015 | Bhargava et al. |
| 2016/0316361 | A1 | 10/2016 | Bhargava et al. |
| 2019/0053048 | A1 | 2/2019 | Hargava et al. |

FOREIGN PATENT DOCUMENTS

| | | |
|---|---|---|
| EP | 0986218 A1 | 3/2000 |
| EP | 1744502 A1 | 1/2007 |
| KR | 20050050236 A | 5/2005 |
| KR | 20100068168 A | 6/2010 |
| WO | WO-03085891 A1 | 10/2003 |
| WO | WO-2011153507 A2 | 12/2011 |
| WO | WO-2012016187 A2 | 2/2012 |
| WO | WO-2012122508 A2 | 9/2012 |
| WO | WO-2015081030 A1 | 6/2015 |
| WO | WO-2015089457 A1 | 6/2015 |

OTHER PUBLICATIONS

Xenakis et al. Dynamic network-based secure VPN deployment in GPRS. The 13th IEEE International Symposium on Personal, Indoor and Mobile Radio Communications 3:1260-1265 (2002).
U.S. Appl. No. 16/160,013 Office Action dated Sep. 6, 2019.
Lei et al. Research on the Method of WLAN Interworking with EPC. Designing Techniques of Posts and Telecommunications (04):35-37 (2013) (English Abstract).
U.S. Appl. No. 16/160,013 Office Action dated Apr. 18, 2019.
Jubin et al. Distributed Rate Allocation for Wireless Networks, URL:http:jjarxiv.orgjabs/1002.2813 [retrieved on Jan. 9, 2012] Apr. 6, 2010, pp. 1-39.
PCT/US2011/039180 International Preliminary Report on Patentability and the Written Opinion dated Dec. 13, 2012.
PCT/US2011/039180 International Search Report dated Jan. 11, 2012.
PCT/US2011/045967 International Preliminary Report on Patentability dated Feb. 14, 2013.
PCT/US2011/045967 International Search Report dated Mar. 19, 2012.
PCT/US2011/045967 Written Opinion dated Jan. 30, 2013.
PCT/US2012/028571 International Preliminary Report on Patentability dated Sep. 19, 2013.
PCT/US2012/028571 International Search Report and Written Opinion dated Aug. 24, 2012.
PCT/US2014/067183 International Preliminary Report on Patentability dated Jun. 9, 2016.
PCT/US2014/067183 International Search Report and Written Opinion dated Feb. 26, 2015.
PCT/US2014/070120 International Preliminary Report on Patentability dated Jun. 23, 2016.
PCT/US2014/070120 International Search Report and Written Opinion dated Mar. 3, 2015.
Sampath. A hypothetical wireless network with mobile base stations in urban areas, Proceedings International Resource Management Conference (3 pgs.) May 19-21, 2003.
Sampath. A Protocol and an Algorithm for Mobile Station Floor Location Suing 'Listeners'. Proceedings 40th ACM Southeastern Conference, pp. 382-387 May 28-31, 2002.
U.S. Appl. No. 14/264,314 Office Action dated Jul. 13, 2015.
U.S. Appl. No. 14/264,314 Office Action dated Jun. 18, 2014.
U.S. Appl. No. 14/264,314 Office Action dated Oct. 30, 2015.
U.S. Appl. No. 14/264,314 Office Action dated Oct. 14, 2014.

\* cited by examiner

CONCURRENT USES OF NON-CELLULAR INTERFACES FOR PARTICIPATING IN HYBRID CELLULAR AND NON-CELLULAR NETWORKS

CROSS-REFERENCE TO RELATED APPLICATION

This application is a continuation of U.S. patent application Ser. No. 14/264,314, filed Apr. 29, 2014, which is a division of U.S. patent application Ser. No. 14/092,446, filed Nov. 27, 2013 and issued as U.S. Pat. No. 8,743,758 on Jun. 3, 2014; the entire contents of which are herein incorporated by reference.

BACKGROUND OF THE INVENTION

Cellular communications have gained much popularity since 1990s. Traditionally, cellular networks are connected to public switched telephone network (PSTN) and are dedicated to voice communications. With advance packet switching technologies, any raw signals can be formed in packets which can flow from the sender to the destination via the cellular networks and non-cellular networks. On the other hand, the manufacturing cost of cell phones, or mobile phones, has decreased significantly, so mobile phones become affordable. It is believed that the mobile phones have penetrated more than 85% of the global population. Furthermore, more functionalities are added to mobile phones, leading the boundaries between mobile phones and personal computing devices to disappear. Many mobiles phones now become smartphones or personal mobile computers. The smartphones allow subscribers not only to talk but also to enjoy the use of the Internet.

Due to a large volume of subscribers using smartphones, the demand of cellular transmission increases exponentially. However, the bandwidths of cellular networks are limited. A typical solution to the problem of bandwidth deficiency is to install more cellular base stations. Nevertheless, in the greater metropolitan areas, e.g., New York City, Chicago, Los Angeles, London, and Tokyo, there are sparse or no spaces to install more cellular base stations. Even though installing more base stations is feasible, users located at the "marginal-to-inoperative regions," such as the coverage edges of base stations, hilly terrain, concrete walls, or tall buildings, still face weak or blocked signals. As a sequel, a new way to increase the cellular coverage is necessary.

SUMMARY OF THE INVENTION

Advantages of the subject matter described herein utilize non-cellular interfaces in a wireless device to concurrently perform multiple wireless connections. Non-cellular networks, such as wireless local area networks, Bluetooth networks and the Internet, are ubiquitous and are also directly or indirectly connected with cellular networks. The subject matter described herein exploits the hybrid of cellular and non-cellular networks to expand the coverage of cellular base stations. When a wireless device participates in a hybrid network, the subject method can configure the device's non-cellular interface to originate or relay a cellular communication via hopping on the non-cellular network, without interrupting an existing non-cellular connection of the device. The concurrent uses of the non-cellular interface maximize the utilization of its computing and communication resources to expand the cellular coverage.

In one aspect, disclosed herein are non-transitory computer-readable storage media encoded with a computer program including instructions executable by a mobile processor to create an application comprising: (a) a first software module configuring a non-cellular interface for establishing a first wireless link between the non-cellular interface and a non-cellular access point, and (b) a second software module configuring the non-cellular interface and a cellular interface for relaying a cellular communication between an originating wireless device and a cellular base station, wherein relaying the cellular communication comprises (i) establishing and maintaining a second wireless link between the non-cellular interface and the originating wireless device; (ii) establishing and maintaining an internal bridge between the second non-cellular virtual interface and the cellular interface; and (iii) establishing and maintaining a third wireless link between the cellular interface and a cellular base station.

In another aspect, disclosed herein is a wireless device on a hybrid of a cellular network and a non-cellular network comprising: (a) a cellular interface, (b) a non-cellular interface, and (c) a processor configured to provide an application comprising: (i) a first software module configuring the non-cellular interface for establishing a first wireless link between the non-cellular interface and a non-cellular access point; and (ii) a second software module configuring the non-cellular interface and the cellular interface for relaying a cellular communication between an originating wireless device and a cellular base station, wherein relaying the cellular communication comprises: (1) establishing and maintaining a second wireless link between the non-cellular interface and the originating wireless device; (2) establishing and maintaining an internal transfer between the second non-cellular virtual interface and the cellular interface; and (3) establishing and maintaining a third wireless link between the cellular interface and a cellular base station.

In another aspect, disclosed herein are non-transitory computer-readable storage media encoded with a computer program including instructions executable by a mobile processor to create an application comprising: (a) a first software module configuring a non-cellular interface for establishing and maintaining a first wireless link between the non-cellular interface and a non-cellular access point; and (b) a second software module configuring the non-cellular interface for originating and maintaining a cellular communication between the non-cellular interface and a relaying wireless device, wherein originating the cellular communication comprises: (i) establishing and maintaining a second wireless link between the non-cellular interface and the relaying wireless device; and (ii) requesting the relaying wireless device to establish and maintain the cellular communication between the relaying wireless device and a cellular base station.

In another aspect, disclosed herein is a wireless device on a hybrid of a cellular network and a non-cellular network comprising: (a) a cellular interface; (b) a non-cellular interface; and (c) a processor configured to provide an application comprising: (i) a first software module configuring the non-cellular interface for establishing and maintaining a first wireless link between the non-cellular interface and a non-cellular access point; and (ii) a second software module configuring the non-cellular interface for originating and maintaining a cellular communication between the non-cellular interface and a relaying wireless device, wherein originating the cellular communication comprises: (1) establishing and maintaining a second wireless link between the non-cellular interface and the relaying wireless device; and (2) requesting the relaying wireless device to establish and maintain the cellular communication between the relaying wireless device and a cellular base station.

In another aspect, disclosed herein are non-transitory computer-readable storage media encoded with a computer program including instructions executable by a mobile processor to create an application comprising: a first software module configuring a non-cellular interface for bridging a cellular communication between an originating wireless device and a relaying wireless device, wherein bridging the cellular communication comprises: (a) establishing and maintaining a first wireless link between the non-cellular interface and the originating wireless device; (b) establishing and maintaining a second wireless link between the non-cellular interface and the relaying wireless device; (c) establishing and maintaining an internal transfer between the first and the second wireless links, wherein the wireless links use different communication protocols; and (d) requesting the relaying wireless device to establish and maintain the cellular communication between the relaying wireless device and a cellular base station.

In another aspect, disclosed herein is a wireless device on a hybrid of a cellular network and a non-cellular network comprising: (a) a cellular interface; (b) a non-cellular interface; and (c) a processor configured to provide an application comprising a first software module configuring the non-cellular interface for bridging a cellular communication between an originating wireless device and a relaying wireless device, wherein bridging the cellular communication comprises: (i) establishing and maintaining a first wireless link between the non-cellular interface and the originating wireless device; (ii) establishing and maintaining a second wireless link between the non-cellular interface and the relaying wireless device; (iii) establishing and maintaining an internal transfer between the first and the second wireless links, wherein the wireless links use different protocols; and (iv) requesting the relaying wireless device to establish and maintain the cellular communication between the relaying wireless device and a cellular base station.

In another aspect, disclosed herein are non-transitory computer-readable storage media encoded with a computer program including instructions executable by a mobile processor to create an application comprising: (a) a first software module configuring a non-cellular interface for establishing and maintaining a first wireless link between the non-cellular interface and a non-cellular access point; and (b) a second software module configuring the non-cellular interface for bridging a cellular communication between an originating wireless device and a relaying wireless device, wherein bridging the cellular communication comprises: (i) establishing a second wireless link between the non-cellular interface and the originating wireless device; (ii) establishing and maintaining a third wireless link between the non-cellular interface and the relaying wireless device; (iii) establishing and maintaining an internal transfer between the second and the third wireless links; and (iv) requesting the relaying wireless device to establish and maintain the cellular communication between the relaying wireless device and a cellular base station.

In another aspect, disclosed herein is a wireless device on a hybrid of a cellular network and a non-cellular network comprising: (a) a cellular interface; (b) a non-cellular interface; and (c) a processor configured to provide an application comprising: (i) a first software module configuring the non-cellular interface for establishing and maintaining a first wireless link between the non-cellular interface and a non-cellular access point; (ii) a second software module configuring and maintaining the non-cellular interface for bridging a cellular communication between an originating wireless device and a relaying wireless device, wherein bridging the cellular communication comprises: (1) establishing and maintaining a second wireless link between the non-cellular interface and the originating wireless device; (2) establishing and maintaining a third wireless link between the non-cellular interface and the relaying wireless device; (3) establishing and maintaining an internal transfer between the second and the third wireless links; and (4) requesting the relaying wireless device to establish and maintain the cellular communication between the relaying wireless device and a cellular base station.

DETAILED DESCRIPTION OF THE INVENTION

Figure 1:
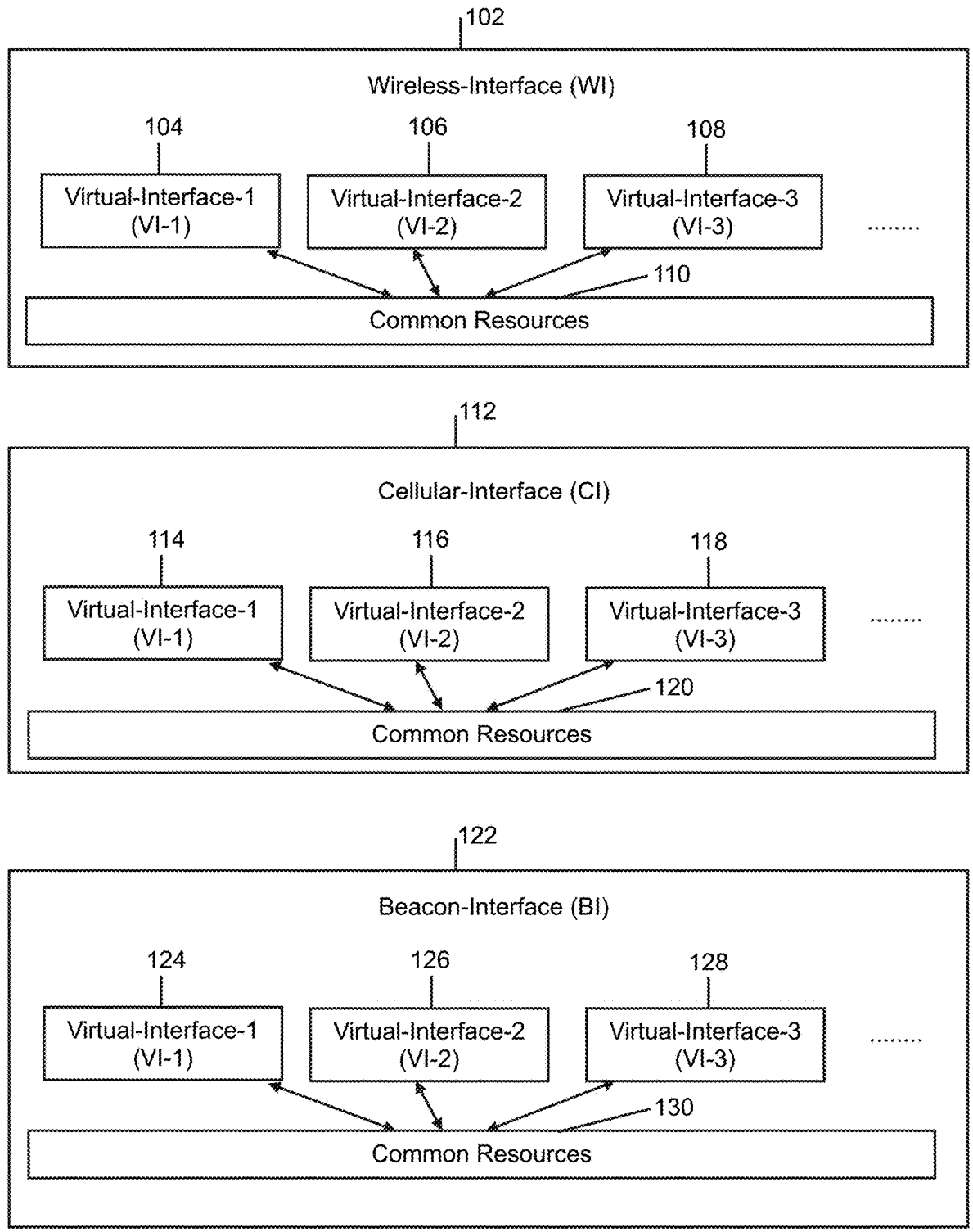
FIG. 1 is an illustrative non-limiting example of multi-task utilization of non-cellular, cellular or beacon interfaces; in this case, each interface hosts two or more modules (called virtual interfaces) which establish and maintain wireless links in a hybrid network.

Cellular communications have gained much popularity since 1990s. The principle of cellular communications is to divide a broad land area into a number of regular shaped cells, for example hexagonal, square, or circular shapes. Each of the cells is assigned one or more cellular base stations or cellular towers as hubs to manage wireless connectivity between mobile phones (or called cell phones) and the base stations. The base stations are further connected to public switched telephone network (PSTN), so traditionally the mobile phones in cellular networks were dedicated to voice communications.

With the advent of packet switching technologies, raw signals (e.g., voice) can be formed in packets which can flow from a sender to a destination without a direct link between the sender and the destination. When cellular networks are deployed with packet switching technologies, a mobile computing device can connect to the Internet or other data networks via a data cellular network. Thanks to modern semiconductor engineering, the sizes of electronic circuitries keep shrinking. When a mobile phone is equipped with electronic chips for handling traditional cellular networks and data cellular networks, the boundary between mobile phone and mobile computing device becomes illusive. Most modern mobile phones are also mobile computing devices.

The manufacturing cost of mobile devices has decreased significantly. Mobile devices become affordable to the general public. It is believed that the mobile devices have penetrated more than 85% of the global population. With a dramatically increasing number of mobile device users, telecommunication providers face a challenge to expand their coverage. Moreover, more functionalities (e.g., camera, web search, emails, maps, Internet surfing) have been added to mobile phones and mobile devices. Mobile device users demand more bandwidths to enjoy the added functionalities. Such a demand compounds the challenge faced by the telecommunication providers.

To address the surging bandwidth demand in cellular networks, a typical solution is to install more cellular base stations. Nevertheless, in the greater metropolitan areas, by way of non-limiting examples, such as New York City, Chicago, Los Angeles, London, and Tokyo, there are sparse or no spaces to install more cellular base stations. Even though in the cases where installing more base stations is feasible, users located at the "marginal-to-inoperative regions," such as the cell edges of base stations, hilly terrain, concrete walls, or tall buildings, still face weak or blocked signals. In particular, the cellular signals at a cell edge not only are weak but also encounter interference induced by adjacent cells, leading to a more serious problem. As a sequel, a new way to increase the cellular coverage is necessary.

In typical cellular communication systems, a mobile device directly communicates with a cellular base station. In other words, the device connects to the cellular base station via a "single hop," where the signals are transmitted and received directly between the device and the cellular base station without being mediated or relayed through an intermediary device. Based on the single hopping communication, the maximum number of mobile phones simultaneously connecting to the base station is limited because the bandwidth of the base station is limited. Although sophisticated schemes of modulation and error-correcting codes can be adopted, the data rates need to be sacrificed.

In addition to cellular networks, there exist various non-cellular wireless networks, for instance, but not limited to, wireless local area networks, wireless wide area networks, Bluetooth networks, and in general the Internet. Modern technologies allow both cellular interface and non-cellular interface to be embedded in a mobile device. In other words, a modern mobile device can participate in a cellular network via the cellular interface, or participate in a non-cellular network via the non-cellular interface. While the two interfaces independently sit in the same mobile device, the subject matter described herein exploits both types of interfaces to expand the coverage of cellular networks.

The subject matter described herein solves the aforementioned problems by using multi-hop schemes in a hybrid of cellular networks and non-cellular networks. The subject matter can be applied to some embodiments of not only mobile devices but also generic wireless devices. To expand the coverage of a cellular communication system, a first wireless device with a poor cellular signal may use its non-cellular interface to communicate to a second wireless device which has a good cellular signal and relays the signals from the first wireless device to the cellular base station. In such embodiments, the cellular resources, such as data rate and bandwidth, of the second wireless device is shared with the first wireless device. The first wireless device successfully communicates to the cellular base station via two hops: hopping to the second wireless device that in turn hops to the cellular base station. The "double-hop" connectivity in these embodiments can be extended to a "multi-hop" connectivity. For example, the first wireless device can hop to the second wireless device, then to a third wireless device, and finally to a cellular base station. The number of hops can be as many as possible, as long as some criteria are satisfied, by way of non-limiting examples, such as battery life, noise level, interference level, data rate, and bandwidth.

The subject matter described herein can further maximize the resources of the non-cellular interfaces by performing concurrent tasks on the non-cellular interfaces. In a hybrid, multi-hop network, a wireless device may have a different role: a sink device, an originating device, and a relaying device. A sink device is a wireless device that has a direct link to a cellular base station. An originating device is a wireless device that has no optimal single-hop wireless link to a cellular base station and that is an end terminal in the path of hopping to the cellular base station. A relaying device is a wireless device that is an intermediary device in a hopping path. No matter which role a wireless device plays, its non-cellular interface can be configured to perform more than one task. In a sink device, it can relay a hopping signal to a cellular base station while connecting itself to a non-cellular access point. Alternatively, a sink device may concurrently relay two or more hopping devices. In an originating device, it hops to another relaying/sink device while connecting itself to a non-cellular access point. In a relaying device, its non-cellular interface is used to establish an upstream link and a downstream link to complete a hopping path; furthermore, the relaying device can connect itself to a non-cellular access point.

Advantages of the subject matter described herein utilize non-cellular interfaces in a wireless device to concurrently perform multiple wireless connections. Non-cellular networks, such as wireless local area networks, Bluetooth networks and the Internet, are ubiquitous and are also directly or indirectly connected with cellular networks. The subject matter exploits the hybrid of cellular and non-cellular networks to expand the coverage of cellular base stations. When a wireless device participates in a hybrid network, the subject method can configure the device's non-cellular interface to originate or relay a cellular communication via hopping on the non-cellular network, without interrupting an existing non-cellular connection of the originating device or of the relaying device. The concurrent uses of the non-cellular interface maximize the utilization of its computing and communication resources to expand the cellular coverage.

In some embodiments, described herein are non-transitory computer-readable storage media encoded with a computer program including instructions executable by a mobile processor of a sink wireless device to create an application comprising: (1) a first software module configuring a non-cellular interface for establishing and maintaining a first wireless link between the non-cellular interface and a non-cellular access point; (2) a second software module configuring the non-cellular interface and a cellular interface for relaying a cellular communication between a downstream wireless device and a cellular base station, wherein relaying the cellular communication comprises: (i) establishing and maintaining a second wireless link between the non-cellular interface and the downstream wireless device; (ii) establishing and maintaining an internal bridge between the second non-cellular virtual interface and the cellular interface; and (iii) establishing and maintaining a third wireless link between the cellular interface and a cellular base station.

In some embodiments, described herein is a sink wireless device on a hybrid of a cellular network and a non-cellular network comprising: (a) a cellular interface; (b) a non-cellular interface; (c) a processor configured to provide an application comprising: (i) a first software module configuring the non-cellular interface for establishing and maintaining a first wireless link between the non-cellular interface and a non-cellular access point; (ii) a second software module configuring the non-cellular interface and the cellular interface for relaying a cellular communication between a downstream wireless device and a cellular base station, wherein relaying the cellular communication comprises: (1) establishing and maintaining a second wireless link between the non-cellular interface and the downstream wireless device; (2) establishing and maintaining an internal bridge between the second non-cellular virtual interface and the cellular interface; and (3) establishing and maintaining a third wireless link between the cellular interface and a cellular base station.

In some embodiments, described herein are non-transitory computer-readable storage media encoded with a computer program including instructions executable by a mobile processor of an originating device to create an application comprising: (a) a first software module configuring a non-cellular interface for establishing and maintaining a first wireless link between the non-cellular interface and a non-cellular access point; (b) a second software module configuring the non-cellular interface for originating a cellular communication between the non-cellular interface and a relaying wireless device, wherein originating the cellular communication comprises: (i) establishing and maintaining a second wireless link between the non-cellular interface and the relaying wireless device; (ii) requesting the relaying wireless device to establish and maintain the cellular communication between the originating wireless device and a cellular base station.

In some embodiments, described herein is an originating wireless device on a hybrid of a cellular network and a non-cellular network comprising: (a) a cellular interface; (b) a non-cellular interface; (c) a processor configured to provide an application comprising: (i) a first software module configuring the non-cellular interface for establishing and maintaining a first wireless link between the non-cellular interface and a non-cellular access point; (ii) a second software module configuring the non-cellular interface for originating a cellular communication between the non-cellular interface and the originating wireless device, wherein originating the cellular communication comprises: (1) establishing and maintaining a second wireless link between the non-cellular interface and the relaying wireless device; (2) requesting the relaying wireless device to establish and maintain the cellular communication between the originating wireless device and a cellular base station.

In some embodiments, described herein are non-transitory computer-readable storage media encoded with a computer program including instructions executable by a mobile processor of a relaying wireless device to create an application comprising a software module configuring a non-cellular interface for bridging a cellular communication between a downstream wireless device and an upstream wireless device, wherein bridging the cellular communication comprises: (a) establishing and maintaining a first wireless link between the non-cellular interface and the downstream wireless device; (b) establishing and maintaining a second wireless link between the non-cellular interface and the upstream wireless device; (c) establishing and maintaining an internal transfer between the first and the second wireless links, wherein the wireless links use different protocols; and (d) requesting the upstream wireless device to establish and maintain the cellular communication between the upstream wireless device and a cellular base station.

In some embodiments, described herein is a relaying wireless device on a hybrid of a cellular network and a non-cellular network comprising: (a) a cellular interface; (b) a non-cellular interface; (c) a processor configured to provide an application comprising a first software module configuring the non-cellular interface for bridging a cellular communication between a downstream wireless device and an upstream wireless device, wherein bridging the cellular communication comprises: (i) establishing and maintaining a first wireless link between the non-cellular interface and the downstream wireless device; (ii) establishing and maintaining a second wireless link between the non-cellular interface and the upstream wireless device; (iii) establishing and maintaining an internal transfer between the first and the second wireless links, wherein the wireless links use different protocols; and (iv) requesting the upstream wireless device to establish and maintain the cellular communication between the upstream wireless device and a cellular base station.

In some embodiments, described herein are non-transitory computer-readable storage media encoded with a computer program including instructions executable by a mobile processor of a relaying wireless device to create an application comprising: (a) a first software module configuring a non-cellular interface for establishing and maintaining a first wireless link between the non-cellular interface and a non-cellular access point; (b) a second software module configuring the non-cellular interface for bridging a cellular communication between a downstream wireless device and an upstream wireless device, wherein bridging the cellular communication comprises: (i) establishing and maintaining a second wireless link between the non-cellular interface and the downstream wireless device; (ii) establishing and maintaining a third wireless link between the non-cellular interface and the upstream wireless device; (iii) establishing and maintaining an internal transfer between the second and the third wireless links; and (iv) requesting the upstream wireless device to establish and maintain the cellular communication between the upstream wireless device and a cellular base station.

In some embodiments, described herein is a relaying wireless device on a hybrid of a cellular network and a non-cellular network comprising: (a) a cellular interface; (b) a non-cellular interface; (c) a processor configured to provide an application comprising: (i) a first software module configuring the non-cellular interface for establishing and maintaining a first wireless link between the non-cellular interface and a non-cellular access point; (ii) a second software module configuring the non-cellular interface for bridging a cellular communication between a downstream wireless device and an upstream wireless device, wherein bridging the cellular communication comprises: (1) establishing and maintaining a second wireless link between the non-cellular interface and the downstream wireless device; (2) establishing and maintaining a third wireless link between the non-cellular interface and the upstream wireless device; (3) establishing and maintaining an internal transfer between the second and the third wireless links; and (4) requesting the upstream wireless device to establish and maintain the cellular communication between the upstream wireless device and a cellular base station.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Wireless Device

In some embodiments, the media, devices, networks, systems, and methods described herein include one or more wireless devices. Suitable wireless devices are, by way of non-limiting examples, mobile phones, mobile computing devices, smartphones, portable computers, tablet computers, mobile computers, hot spots, routers, gateways, switches, cameras, audio recorders, video recorders, music players, video players, portable electronic devices, and wearable electronic devices. Alternatively, the wireless devices may be non-portable devices containing cellular interfaces and/or non-cellular interfaces; by way of a non-limiting example, a computing device in a data center may have an adaptor for cellular communication and another adaptor for non-cellular communication.

In some embodiments, a wireless device used by the subject matter described herein is equipped with a non-cellular interface only; i.e., the device doesn't comprise a cellular interface. With appropriate configuration, the wireless device can utilize the non-cellular interface to establish two concurrent wireless links. For instance, mobile computing devices (e.g., iPads) equipped with only non-cellular interfaces (e.g., Wi-Fi chipsets) may be embodied. In further embodiments, the wireless device can use the non-cellular interface as a beacon interface to transmit and receive beacon signals.

In some embodiments, the wireless devices on a hybrid network described in the subject matter are of the same type. By way of limiting examples, the wireless devices could be all mobile phones, or portable computers. In other embodiments, the types of the wireless devices on a hybrid network are mixed. For instance, by way of a non-limiting example, a wireless device may be a smartphone, another wireless device may be a laptop, and another wireless device may be a Wi-Fi hot spot.

In some embodiments, the media, devices, networks, systems, and methods described herein include a wireless device equipped with a digital processor, or use of the same. In further embodiments, the digital processor includes one or more hardware central processing units (CPU) that carry out the device's functions. In still further embodiments, the digital processor further comprises an operating system configured to perform executable instructions.

In some embodiments, the wireless device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the wireless device includes a storage and/or memory device. The storage and/or memory device is one or more physical apparatuses used to store data or programs on a temporary or permanent basis. In some embodiments, the storage device is volatile memory and requires power to maintain stored information. In some embodiments, the device is non-volatile memory and retains stored information when the wireless device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the storage device includes, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the wireless device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the wireless device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Interface

In some embodiments, the media, devices, networks, systems, and methods described herein include using an interface for cellular, non-cellular, and/or beaconing communications. An interface is a hardware module, implemented by an electronic circuitry, to generate and receive an electromagnetic wave. In some cases, the implementation of the interface belongs to part of an electronic circuitry. By way of a non-limiting example, the electromagnetic wave may be a radiofrequency wave, a light beam, or an infrared wave. In some cases, the interface may further include an electronic circuitry for controlling the electromagnetic waveform modulation, demodulation, encoding, decoding, generation, and/or receiving. The controlling mechanisms may be implemented by a hardware module, by a software module, or by a combination of hardware and software modules.

In cellular communications, a cellular interface is the interface for connecting a device to a cellular base station. The cellular interface is able to perform a cellular communication with a required protocol. In some embodiments, the cellular interface may be dynamically configured to execute distinct cellular communication technologies and protocols, by way of non-limiting examples, such as Global System for Mobile Communications (GSM), General Packet Radio Service (GPRS), Enhanced Data Rates for GSM Evolution (EDGE), Universal Mobile Telecommunications System (UMTS), Code Division Multiple Access (CDMA), Wideband Code Division Multiple Access (W-CDMA), High Speed Packet Access (HSPA), Long Term Evolution (LTE), Long Term Evolution Advanced (LTE Advance), Long Term Evolution Direct (LTE Direct), and Worldwide Interoperability for Microwave Access (WiMAX).

In some embodiments, the media, devices, networks, systems, and methods described herein include using a non-cellular interface for non-cellular network connections. The non-cellular interface is able to perform a required protocol to connect itself to another device in a non-cellular network. In the industry of information technology, non-cellular interfaces are frequently referred to as wireless interfaces. Examples of non-cellular networks include, but not limited to, wireless local area networks, wireless wide area networks, Bluetooth networks, and infrared networks. In some embodiments, the non-cellular interface may be dynamically configured to execute one or more distinct non-cellular communication technologies and protocols, by way of non-limiting examples, such as IEEE 802.11 standards, IEEE 802.16 standards, AP/STA protocols, Independent Basic Service Set (IBSS), Peer-to-Peer (P2P), P2P-GO/P2P-Client, Long Term Evolution Direct (LTE Direct), Worldwide Interoperability for Microwave Access (Wi-MAX), IEEE 802.16, Mobile Multi-Hop Relay (MMR) Bluetooth, and FlashLinQ.

In some embodiments, the media, devices, networks, systems, and methods described herein include using a beacon interface for sending and receiving beacon signals. In certain embodiments, the beacon interface is the same as a non-cellular interface, or a cellular interface. In other embodiments, the beacon interface shares part of the circuitry of a non-cellular interface or a cellular interface. Alternatively, the beacon interface may be an isolated circuitry independent of a cellular interface and independent of a non-cellular interface, such as, by way of non-limiting examples, devices under standards of IEEE 802.11p standard, LTE-Direct, and FlashLinQ.

Virtual Interface

In some embodiments, the media, devices, networks, systems, and methods described herein include using an interface of a wireless device for cellular, non-cellular, and/or beaconing communications. An interface may be a hardware module, software module, or a combination of hardware and software modules. However, appropriately controlling the interface and scheduling various tasks running on the interface can virtually create multiple interfaces on the wireless device, allowing the interface to simultaneously execute different tasks. The tasks include, by way of non-limiting examples, transmitting/receiving beacon signals, establishing wireless links, maintaining wireless links, routing data frames, switching data frames, directing data frames, readdressing data frames, reassembling data frames, and handling one or more protocols. The tasks may be realized by another hardware module, or they may be implemented by a software module.

FIG. 1 shows non-limiting embodiments of virtual interfaces. A non-cellular/wireless interface 102 contains common resources 110 for the purpose of non-cellular communication, which include, by way of non-limiting examples, signal processors, antennas, oscillators, resonators, amplifiers, transmitters, receivers, modulators, demodulators, encoders, decoders, logic components, and/or bus connections. The subject matter described herein can configure the common resources 110 to perform multiple tasks in parallel. This process is equivalent to creating virtual non-cellular interfaces 104, 106, and 108, where each virtual non-cellular interface can execute an independent task. By way of non-limiting examples, the virtual interface 104 can connect to a non-cellular access point using the STA protocol, the virtual interface 106 can connect to a wireless device using the P2P-GO or P2P-Client protocol, and the virtual interface 108 can connect to another wireless device using the AP or STA protocol. Those of skill in the art can recognize various communication protocols to be implemented on a virtual interface.

Referring to FIG. 1, a cellular interface 112 contains common resources 120 for the purpose of cellular communication. The resources may include, by way of non-limiting examples, signal processors, antennas, oscillators, resonators, amplifiers, transmitters, receivers, modulators, demodulators, encoders, decoders, logic components, and/or bus connections. The subject matter described herein can configure the common resources 120 to perform multiple tasks in parallel. This process is equivalent to creating virtual cellular interfaces 114, 116, and 118, where each virtual cellular interface can execute an independent task. By way of non-limiting examples, the virtual interface 114 can connect to a cellular base station using the HSPA protocol, the virtual interface 116 can connect to another cellular base station using LTE protocol, and the virtual interface 118 can perform a beaconing task.

With reference to FIG. 1, similar to wireless interface and cellular interface, a beacon interface 122 contains common resources 130 for the purpose of establishing and maintaining cellular and non-cellular communication. The resources may include, by way of non-limiting examples, signal processors, antennas, oscillators, resonators, amplifiers, transmitters, receivers, modulators, demodulators, encoders, decoders, logic components, and/or bus connections. The subject matter described herein can configure the common resources 130 to perform multiple tasks in parallel. This process is equivalent to creating virtual beacon interfaces 124, 126, and 128, where each virtual beacon interface can execute an independent task. By way of non-limiting examples, the virtual interface 124 can broadcast the current cellular signal strength, the virtual interface 126 can receive beacons from other wireless devices, and the virtual interface 128 can send out a hopping request.

Wireless Links

In some embodiments, the media, devices, networks, systems, and methods described herein comprise establishing and/or maintaining a wireless link. Establishing/maintaining a wireless link may be performed by an interface or by a virtual interface. Concurrently establishing/maintaining two or more wireless links may be performed by two or more virtual interfaces that are configured on a single interface. Establishing/maintaining a wireless link comprises transmitting wireless signals and receiving wireless signals until the end of a communication session.

Establishing/maintaining a wireless link comprises transmitting wireless signals and receiving wireless signals until the end of a communication session. Transmitting wireless signals includes, but not limited to, dissembling data files into data packets, encoding the data, modulating bit streams, and/or generating electromagnetic waves. Receiving wireless signals includes, but not limited to, receiving electromagnetic waves, demodulating waves, decoding bit streams, and/or assembling data packets into data files. In further embodiments, establishing wireless links may be conditioned on some conditions. By way of non-limiting examples, suitable conditions are battery life, bandwidth usages, device types, node-state signals, levels of mobility, time of day, subscription fees, user profiles, non-cellular signal strengths, cellular signal strengths, noise levels, and/or interference levels. By way of non-limiting examples, a battery life may include an amount of energy available, an amount of battery storage capacity, an amount of remaining unexhausted energy, an estimated use of time/energy for conducting hopping, the current usage pattern of batteries, an absolute amount of energy stored, an amount of fluid remaining in a reservoir (e.g., an amount of hydrogen or methane in a fuel cell). By way of non-limiting examples, bandwidth usages may include available bandwidth for establishing wireless links, an uplink available bandwidth, a downlink available bandwidth, and an estimated usage of bandwidth; the aforementioned bandwidths include cellular bandwidths and non-cellular bandwidths. By way of non-limiting examples, a device type may include a machine type (e.g., phone, tablet computing device, laptop, server, desktop computer), a number of processor cores, an amount of memory in the device, a number of antennas coupled to a cellular interface of the device, a number of antennas coupled to a non-cellular interface of the device, and an operating system type. By way of non-limiting examples, a node-state signal (e.g., a beacon signal) may contain information regarding a number of hops between the device and a cellular base station, an identifier of a cellular network operator, signal strength of a cellular base station at a gateway device or at a sink device, a location of the device, movement of the device, available cellular/non-cellular bandwidth for hopping, a number of hops, estimated path loss, a channel quality indicator, a number of cellular base stations available, a ratio of energy-per-bit to noise-per-bit, signal quality, an RSSI value, an RCPI value, and a number of wireless devices already participating in a channel. By way of non-limiting examples, a level of mobility may include sensing through components of a wireless device, detecting position and changes of position, and calculating a Doppler shift of wireless signals received by the wireless device. By way of non-limiting examples, a time of day may include the time relative to usage profiles and a time relative to busy hours. By way of non-limiting examples, subscription fees may include an amount that the device user has promised to pay a cellular network operator. By way of non-limiting examples, user profiles may include user behaviors, a user's relationship with the cellular network operator, a type of customer (e.g., long-term customer, or pay-on-the go customer), and a number of years having used the network service provider. By way of non-limiting examples, an interference level may include cellular interference levels and non-cellular interference levels.

In some embodiments, a wireless device requests another device to relay a cellular communication. The request may explicitly send out a signal, or may be embedded in a protocol. The request may be implemented in the physical level or in the software level. The request may be conditioned on some of the aforementioned conditions.

Sink Device

Figure 2:
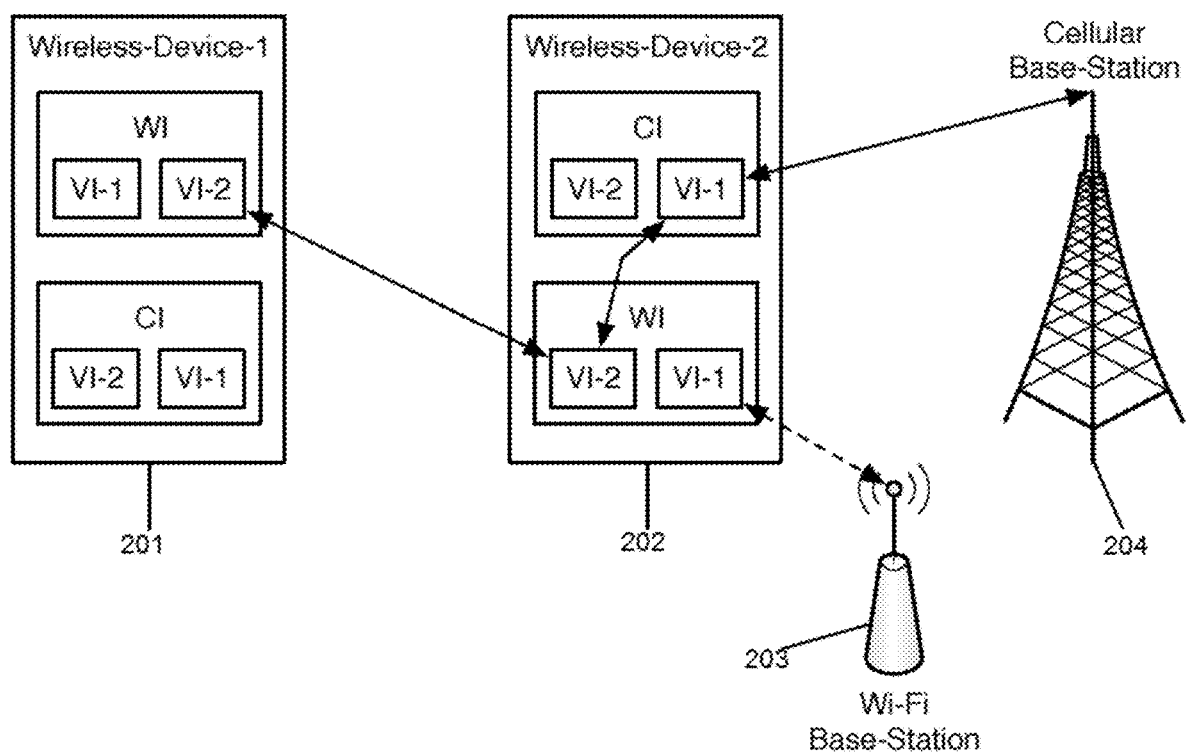
FIG. 2 is an illustrative non-limiting example of a sink device in a multi-hop, hybrid communication system; in this case, a sink wireless device used the non-cellular interface to concurrently relay a cellular communication and connect to a Wi-Fi base station.

In some embodiments, the media, devices, networks, systems, and methods described herein include a wireless device as a sink device. Referring to FIG. 2, a sink device is the wireless device 202 that has a direct wireless link to a cellular base station 204. Configuring the non-cellular/wireless interface can create two or more virtual non-cellular interfaces. In further embodiments, one virtual non-cellular interface may be used to communicate with a Wi-Fi base station 203 or a non-cellular access point. The other virtual non-cellular interface may be used to communicate to a downstream wireless device 201. In certain embodiments, the wireless link to the wireless device 201 is to allow the wireless device 201 to participate in the hybrid network and transfer data between devices 201 and 202. Alternatively, the sink device 202 uses one of its virtual non-cellular interface to relay a cellular communication between the wireless device 201 and the cellular base station 204, wherein relaying the cellular communication comprises: establishing and maintaining a wireless link between wireless devices 201 and 202; establishing and maintaining a bridge internal to the device 202 between the cellular interface and non-cellular interface; and establishing and maintaining a wireless link between the cellular interface and the cellular base station 204. In some embodiments, the sink device can relay two or more other wireless devices.

In the embodiments where a sink device relays a cellular communication, the devices contains a module to perform internal data transfer by reassembling one or more data frames received at the virtual non-cellular interface into a format defined by the protocol used in the cellular interface, and forwarding the reassembled data frames to the cellular interface.

In some embodiments, the distinct links to virtual non-cellular interfaces of a sink device can run on a same protocol or different protocols. In some embodiments, some criteria may be considered for a sink device to relay a cellular communication. By way of nonlimiting examples, suitable criteria comprise one or more of the following: a battery life, a bandwidth usage, a device type, a node-state signal, a level of mobility, a time of day, a subscription fee, a user profile, a non-cellular signal strength, a cellular signal strength, a noise level, and an interference level.

Figure 3:
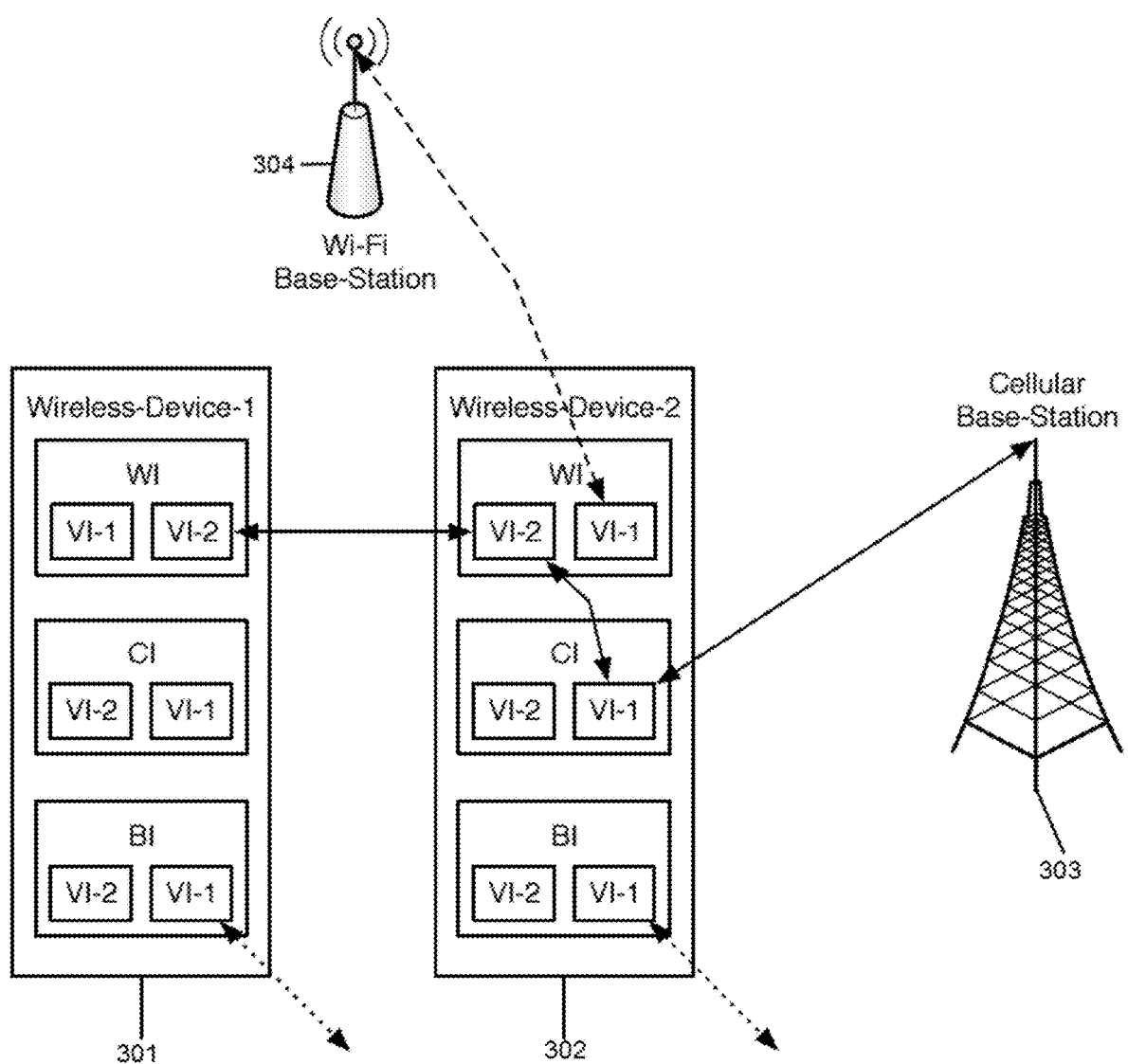
FIG. 3 is an illustrative non-limiting example of a sink device in a multi-hop, hybrid communication system; in this case, a sink wireless device used the non-cellular interface to concurrently relay a cellular communication and connect to a Wi-Fi base station and used a beacon interface to send/receive beacon signals.

Referring to FIG. 3, in some embodiments, a sink device 302 may further comprise a beacon interface BI that is concurrently configured to send and receive beacon signals. In these embodiments, the beacon interface is part of a non-cellular interface, part of a cellular interface, or an independent circuitry. In the cases where the beacon interface is the same as the non-cellular interface, the concurrent uses of the non-cellular interface are to establish and maintain additional wireless links to perform beacon signaling. In some embodiments, the beacon signal comprises one or more of the following: a battery life, a bandwidth usage, a device type, a node-state signal, a level of mobility, a time of day, a subscription fee, a user profile, a non-cellular signal strength, a cellular signal strength, a noise level, and an interference level.

Originating Device

Figure 4:
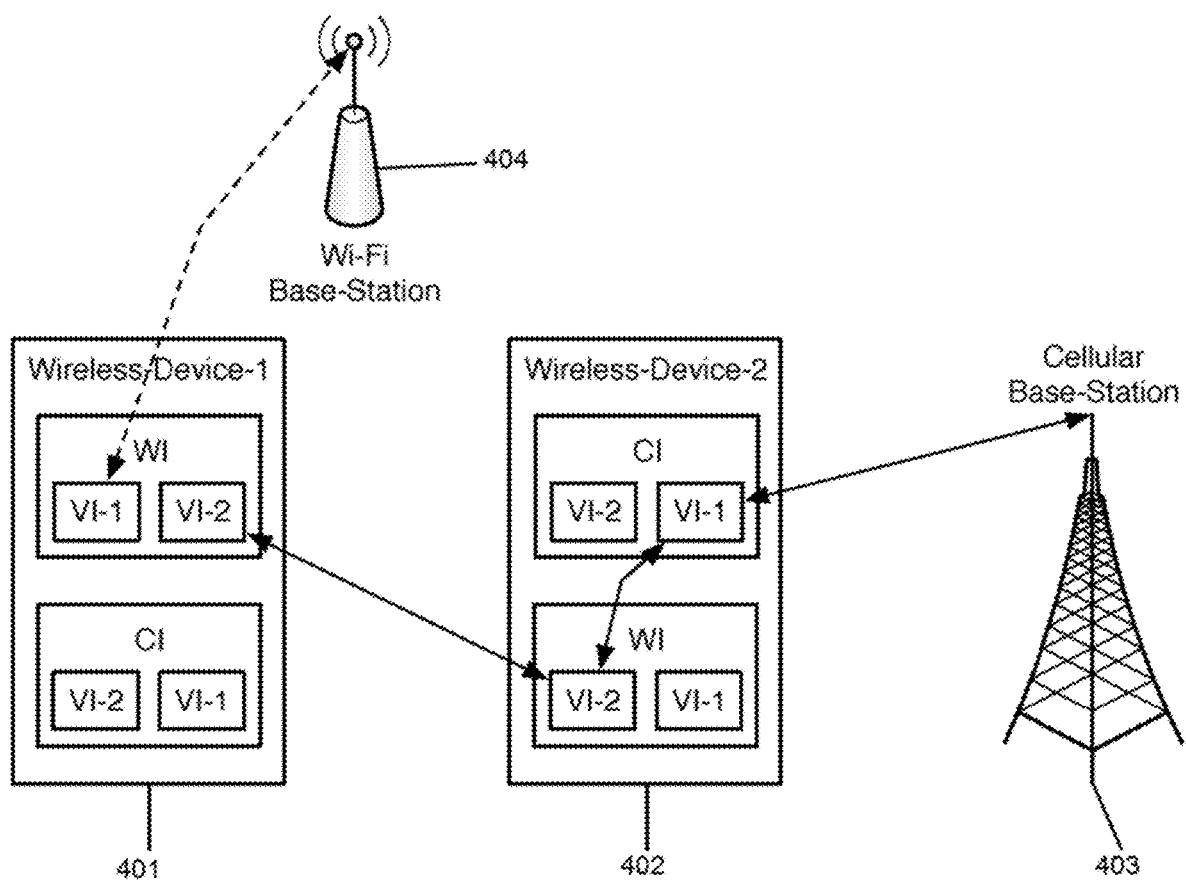
FIG. 4 is an illustrative non-limiting example of an originating device in a multi-hop, hybrid communication system; in this case, an originating wireless device used the non-cellular interface to concurrently originate a cellular communication and connect to a Wi-Fi base station.

In some embodiments, the media, devices, networks, systems, and methods described herein include a wireless device as an originating device. Referring to FIG. 4, an originating device is the wireless device 401 that has no optimal data communication to a cellular base station 403 and that is an end terminal in the path of its cellular communication to the cellular base station 403. Configuring the non-cellular/wireless interface can create two or more virtual non-cellular interfaces. In further embodiments, one virtual non-cellular interface may be used to communicate with a Wi-Fi base station 404 or a non-cellular access point. The other virtual non-cellular interface may be used to communicate to an upstream wireless device 402. In some cases, the wireless connection to the wireless device 402 is to transfer data between devices 401 and 402. In other cases, the wireless link to the wireless device 402 is to request the wireless device 402 to relay a communication to a further wireless device, a non-cellular access point, or a cellular base station 403. In some embodiments, the originating device configures its non-cellular interface to concurrently connect to two or more other wireless devices.

In some embodiments, the distinct links to virtual non-cellular interfaces of an originating device can run on a same protocol or on different protocols. In some embodiments, some criteria may be considered for an originating device to relay a cellular communication. By way of nonlimiting examples, suitable criteria comprise one or more of the following: a battery life, a bandwidth usage, a device type, a node-state signal, a level of mobility, a time of day, a subscription fee, a user profile, a non-cellular signal strength, a cellular signal strength, a noise level, and an interference level.

Figure 5:
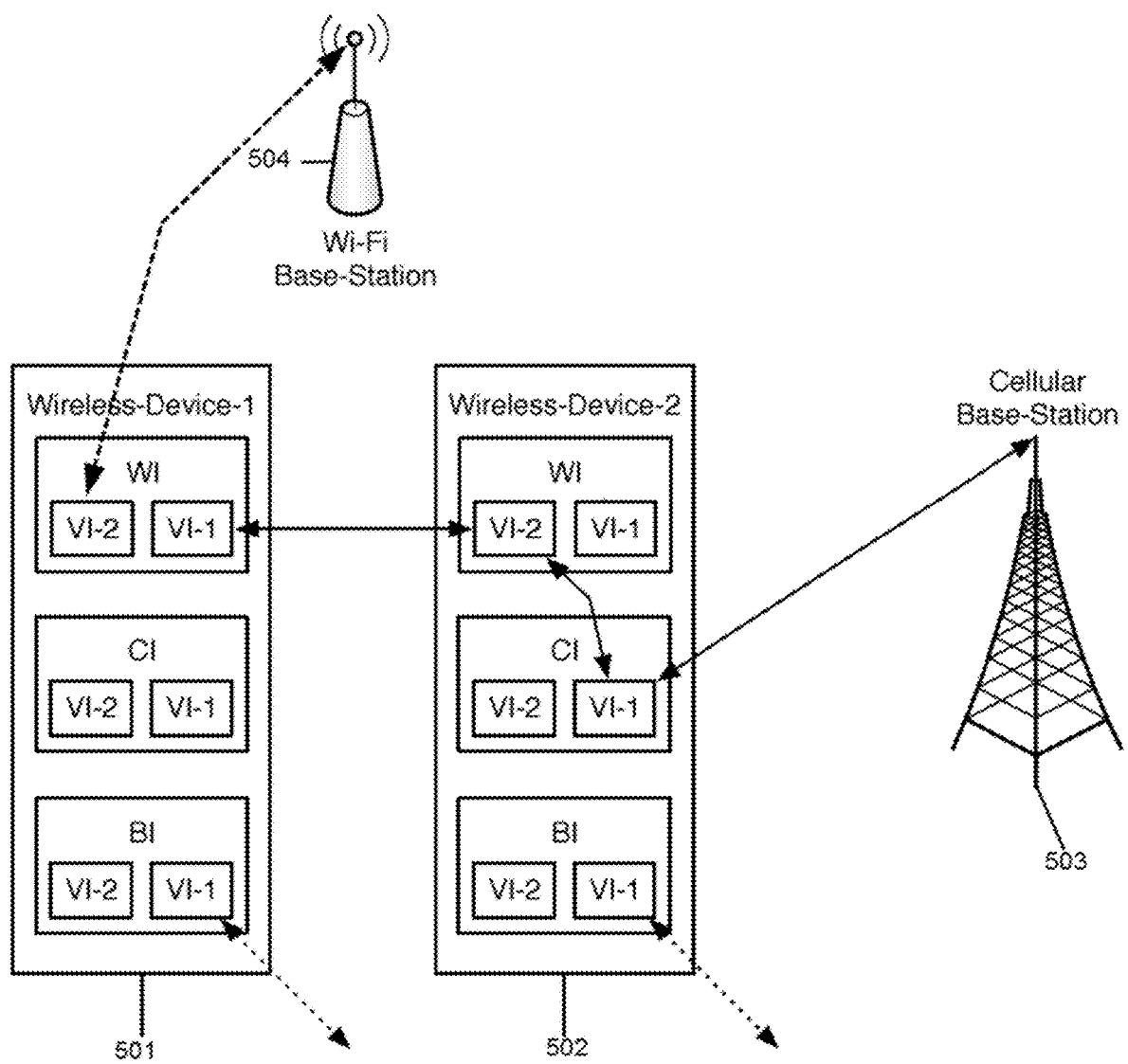
FIG. 5 is an illustrative non-limiting example of an originating device in a multi-hop, hybrid communication system; in this case, an originating wireless device used the non-cellular interface to concurrently originate a cellular communication and connect to a Wi-Fi base station and used a beacon interface to send/receive beacon signals.

Referring to FIG. 5, in some embodiments, an originating device 501 may further comprise a beacon interface BI that is concurrently configured to send and receive beacon signals. In these embodiments, the beacon interface is part of a non-cellular interface, part of a cellular interface, or an independent circuitry. In the cases where the beacon interface is the same as the non-cellular interface of an originating device, the concurrent uses of the non-cellular interface are establishing one or more wireless links and performing beacon signaling. In some embodiments, the beacon signal comprises one or more of the following: a battery life, a bandwidth usage, a device type, a node-state signal, a level of mobility, a time of day, a subscription fee, a user profile, a non-cellular signal strength, a cellular signal strength, a noise level, and an interference level.

Relaying Device

Figure 6:
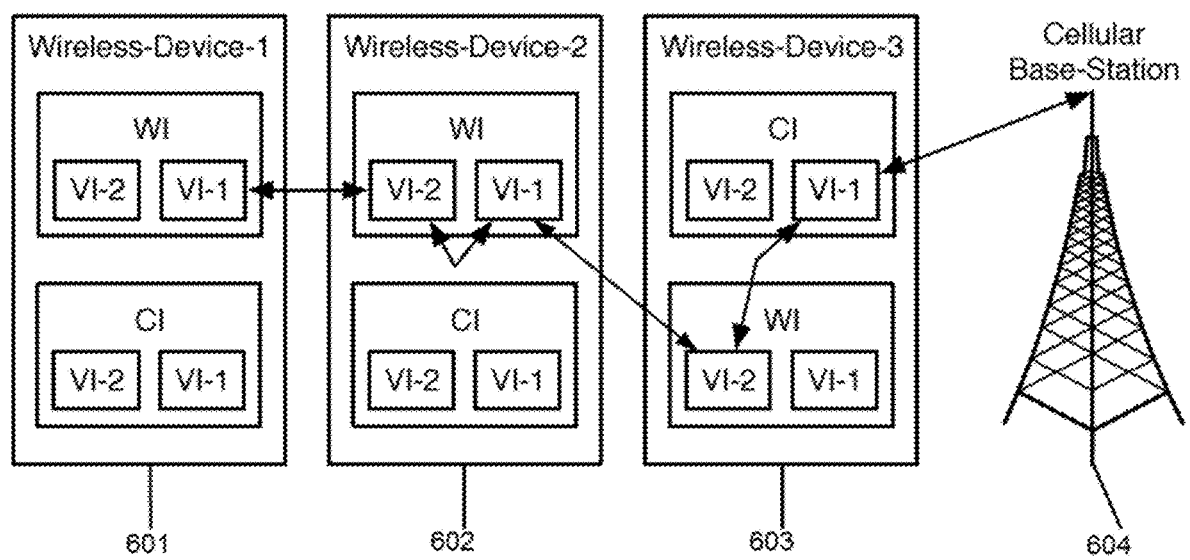
FIG. 6 is an illustrative non-limiting example of a relaying device in a multi-hop, hybrid communication system; in this case, a relaying wireless device used the non-cellular interface to concurrently establish two wireless links running different protocols.
Figure 7:
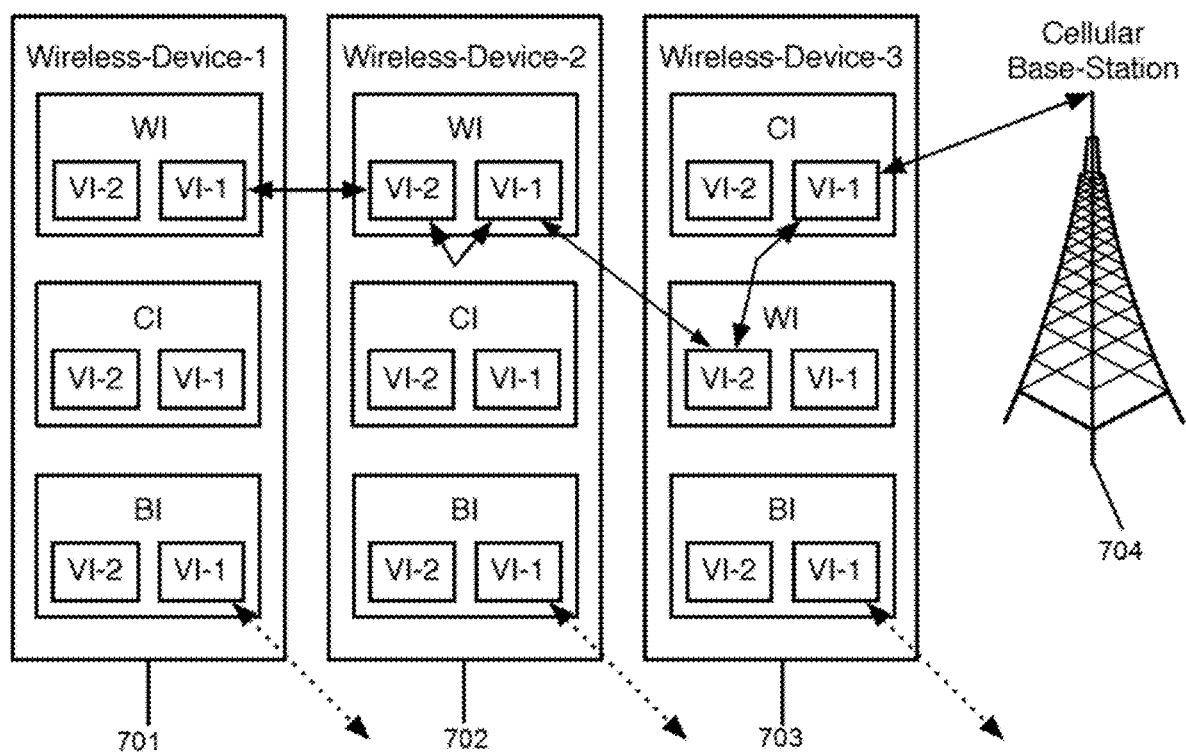
FIG. 7 is an illustrative non-limiting example of a relaying device in a multi-hop, hybrid communication system; in this case, a relaying wireless device used the non-cellular interface to concurrently establish two wireless links running different protocols and used a beacon interface to send/receive beacon signals.

In some embodiments, the media, devices, networks, systems, and methods described herein include a wireless device as a relaying device. Referring to FIG. 6, a relaying device is the wireless device 602 that is an intermediary device in a communication path. Configuring the non-cellular/wireless interface can create two or more virtual non-cellular interfaces. In further embodiments, one virtual non-cellular interface may be used to communicate with downstream wireless device 601, and the other may be used to communicate with an upstream wireless device 603. In some cases, the wireless connections to wireless devices 601 and 603 are for the purpose of data transfer. In other cases, the wireless links to the wireless devices 601 and 603 are to complete a cellular communication between device 601 and cellular base station 604.

In some embodiments, the distinct links to virtual non-cellular interfaces of a relaying device can run on a same protocol. By way of non-limiting examples, suitable protocol options are IEEE 802.11 standards, AP/AP protocols, STA/STA protocols, IBSS/IBSS protocols, P2P-GO/P2P-GO protocols, and P2P-Client/P2P-Client protocols. In some other embodiments, the distinct links to virtual non-cellular interfaces of a relaying device can run on different protocols. By way of non-limiting examples, suitable protocol options are IEEE 802.11 standards, AP/STA protocols, AP/IBSS protocols, STA/IBSS protocols, AP/P2P-Client protocols, AP/P2P-GO protocols, P2P-GO/STA protocols, STA/P2P-Client protocols, P2P-GO/IBSS protocols, P2P-Client/IBSS protocols, and P2P-GO/P2P-Client protocols. Those of skill in the art can recognize various protocols to be combined in the examples. FIG. 6 shows embodiments where the links to the relaying device 602 have different protocols. The relaying device 602 creates an internal transfer mechanism to connect the links to devices 601 and 603. The internal transfer comprises reassembling one or more data frames received from one device 601/603 into a format defined by the protocol used in the other wireless link to device 603/601 and forwarding the reassembled data frames to the device 603/601. By way of a non-limiting example, the link between devices 601 and 602 may operate the IBSS protocol, while the link between device 602 and 603 may run on the AP/STA protocols.

Figure 8:
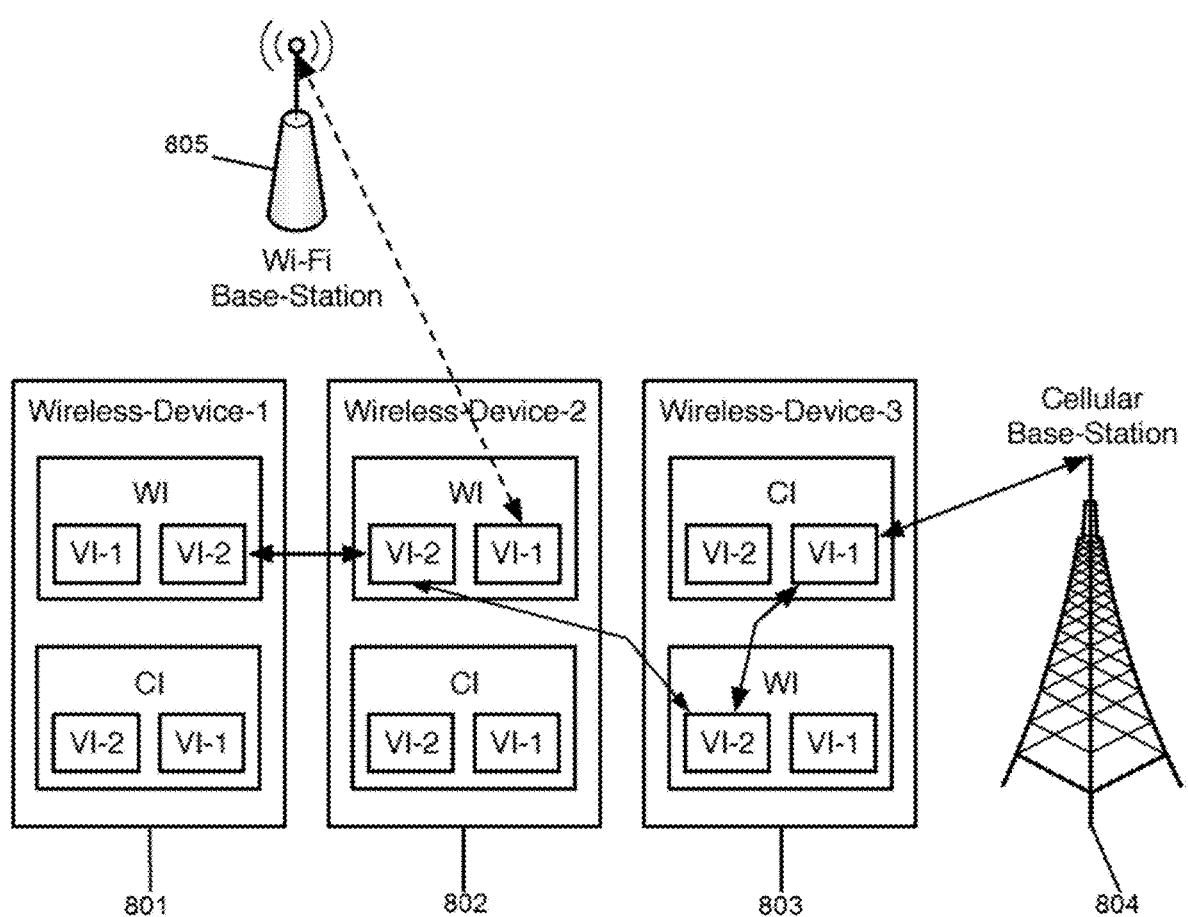
FIG. 8 is an illustrative non-limiting example of a relaying device in a multi-hop, hybrid communication system; in this case, a relaying wireless device used the non-cellular interface to concurrently relay a cellular communication and connect to a Wi-Fi base station.
Figure 9:
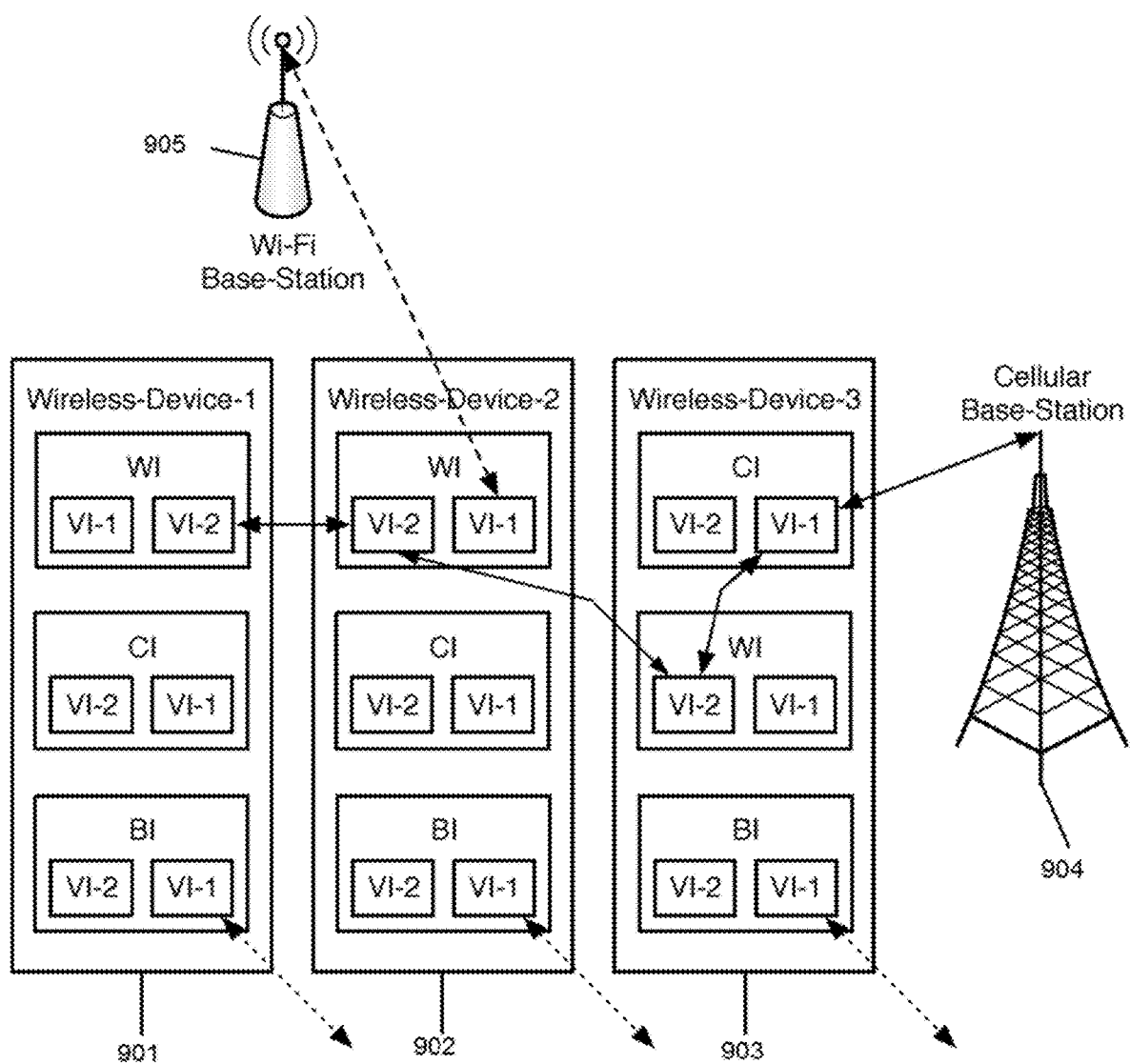
FIG. 9 is an illustrative non-limiting example of a relaying device in a multi-hop, hybrid communication system; in this case, a relaying wireless device used the non-cellular interface to concurrently relay a cellular communication and connect to a Wi-Fi base station and used a beacon interface to send/receive beacon signals.

Referring to FIG. 8, the relaying device is the wireless device 802 that is an intermediary device in a communication path. Configuring the non-cellular/wireless interface can create two or more virtual non-cellular interfaces. Furthermore, one virtual non-cellular interface may be used to communicate with a Wi-Fi base station 805, and the other may be used to communicate with a downstream wireless device 801 and an upstream wireless device 803. In some cases, a wireless connection to a wireless device, 801 or 803, is for the purpose of data transfer. In some other cases, the wireless links to the wireless devices 801 and 803 are to complete a cellular communication between device 801 and cellular base station 804.

In some embodiments where a relaying device connects to a non-cellular base station or an access point while relaying two other wireless devices, the three wireless links can run on a same protocol or different protocols. Referring to FIG. 8, the relaying links between devices 801 and 803 use a same protocol, but the link to Wi-Fi base station 805 uses a different protocol. By way of a non-limiting example, the link between device 802 and Wi-Fi base station 805 may run on the STA protocol, while the links of the device 802 to devices 801 and 803 may operate the IBSS protocol. The virtual non-cellular interface for the relaying purpose is similar to a router to transfer the signals between devices 801 and 803.

Figure 10:
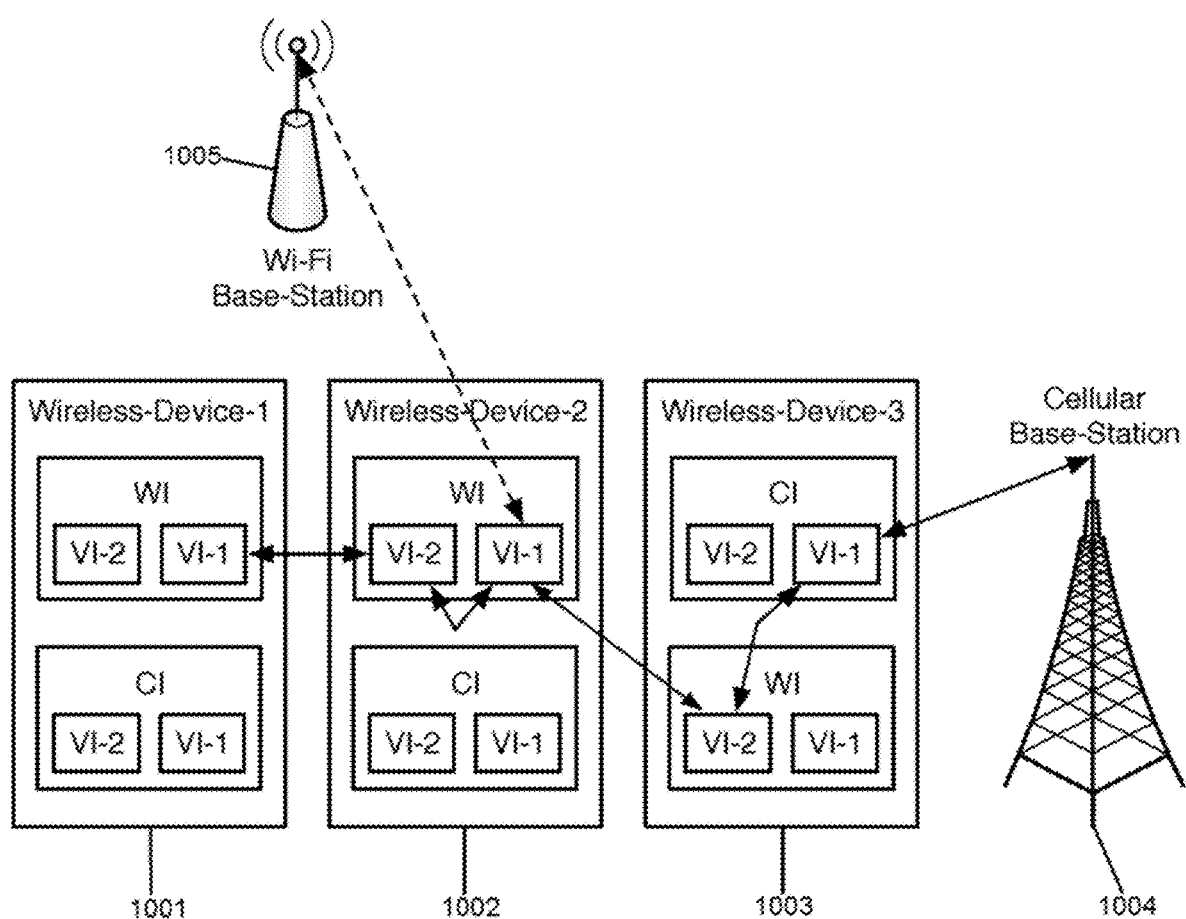
FIG. 10 is an illustrative non-limiting example of a relaying device in a multi-hop, hybrid communication system; in this case, a relaying wireless device used the non-cellular interface to concurrently relay a cellular communication running two different protocols and connect to a Wi-Fi base station.
Figure 11:
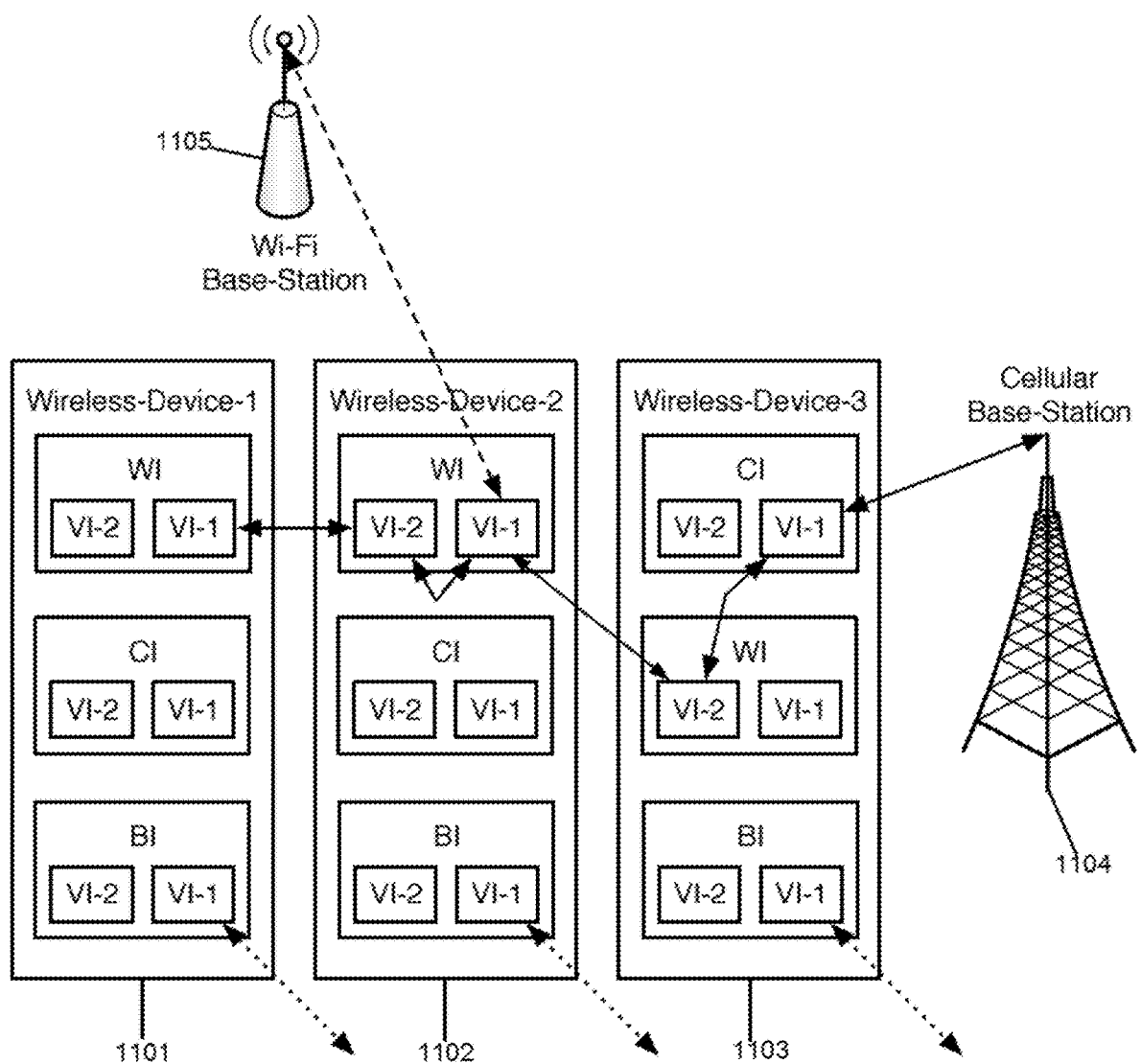
FIG. 11 is an illustrative non-limiting example of a relaying device in a multi-hop, hybrid communication system; in this case, a relaying wireless device used the non-cellular interface to concurrently relay a cellular communication running two different protocols and connect to a Wi-Fi base station and further used a beacon interface to send/receive beacon signals.

In some embodiments like FIG. 10, two virtual non-cellular interfaces are created to operate two different protocols. The link to Wi-Fi base station 1005 and the link to the upstream device 1003 use a same protocol and share the same virtual non-cellular interface. The link to downstream device 1001 uses a different protocol. By way of a non-limiting example, the links of the device 1002 to the Wi-Fi base station 1005 and the upstream device 1003 may run on the STA protocol, while the link between the devices 1002 and 1001 may operate the AP protocol.

Figure 12:
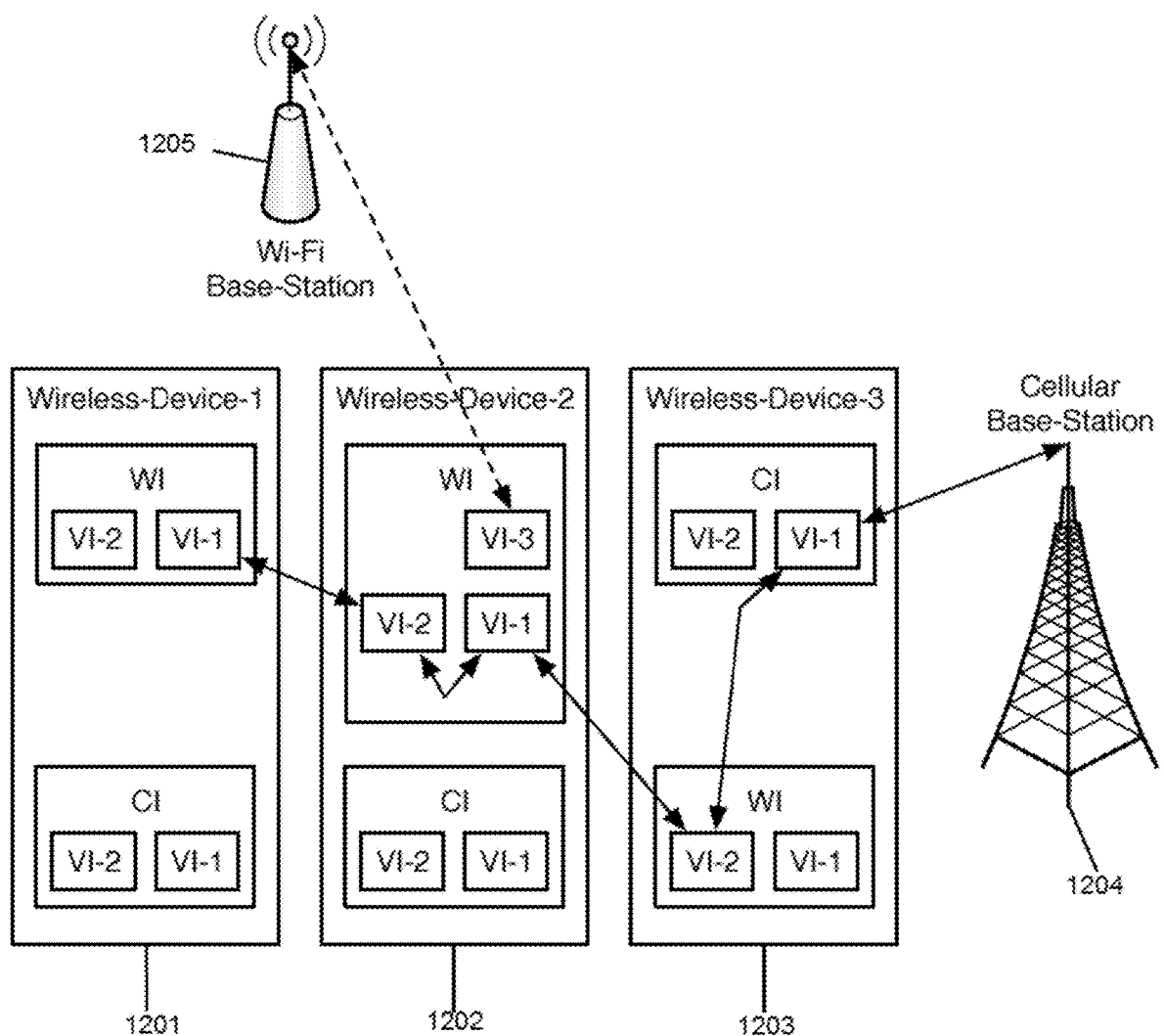
FIG. 12 is an illustrative non-limiting example of a relaying device in a multi-hop, hybrid communication system; in this case, a relaying wireless device used the non-cellular interface to (i) concurrently relay a cellular communication and connect to a Wi-Fi base station, where three wireless links ran different protocols.
Figure 13:
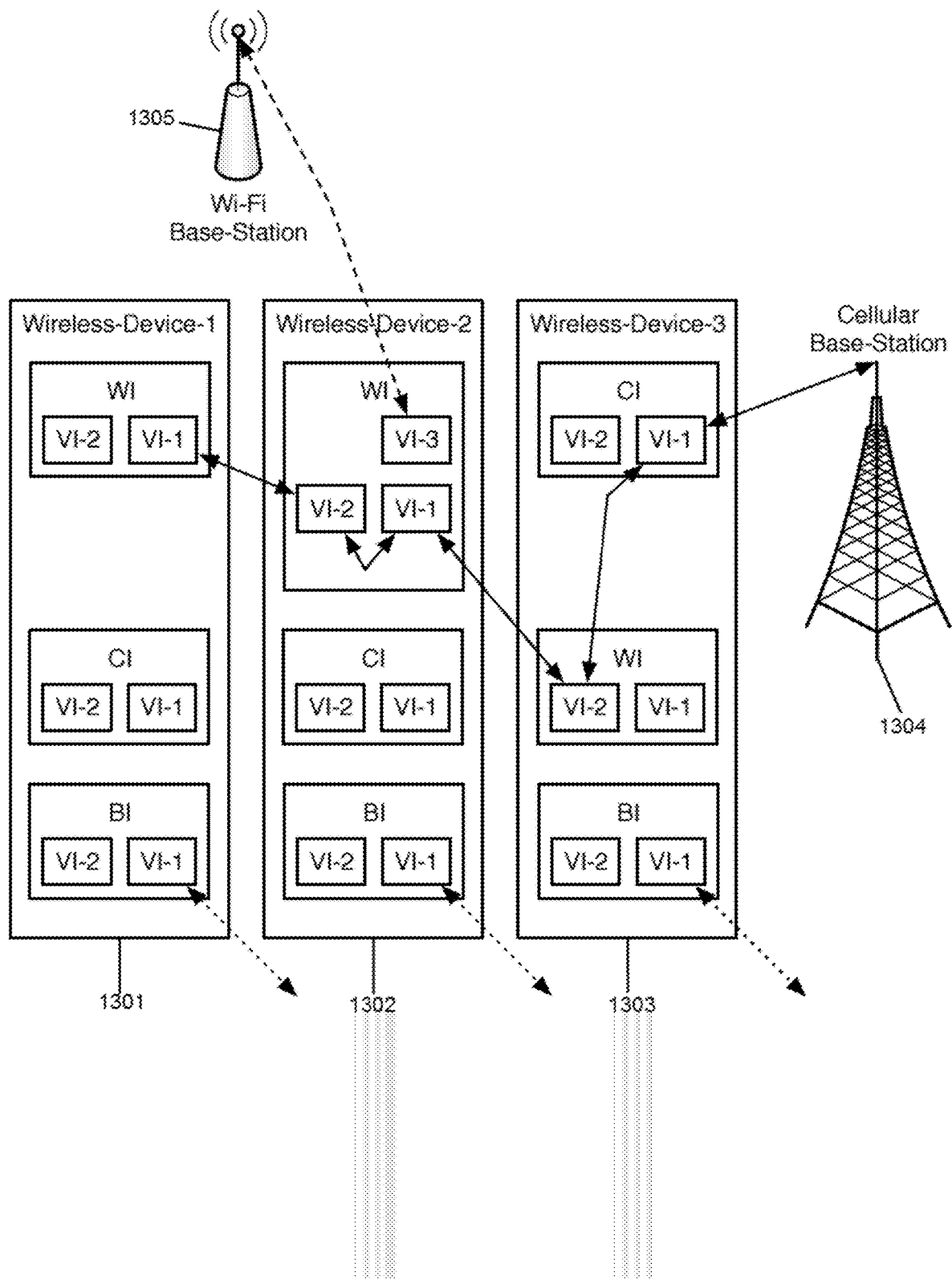
FIG. 13 is an illustrative non-limiting example of a relaying device in a multi-hop, hybrid communication system; in this case, a relaying wireless device used the non-cellular interface to (i) concurrently relay a cellular communication and connect to a Wi-Fi base station, where three wireless links ran different protocols; and (ii) used a beacon interface to send/receive beacon signals.

Illustrated in FIG. 12 are embodiments where each of the links of a relaying device 1202 to other devices (i.e., Wi-Fi base station 1205 and devices 1201 and 1203) uses a distinct virtual interface to operate a protocol. By way of a non-limiting example, the link between the device 1202 and Wi-Fi base station 1205 may use the same STA protocol as the link between the device 1202 and the upstream device 1203, while the link between the devices 1202 and 1201 may use another protocol AP. In the embodiments shown in FIG. 12, three virtual non-cellular interfaces are created on a single non-cellular interface to operate three independent links. Since the links to the downstream wireless devices 1201 and upstream devices 1203 use distinct protocols, an internal transfer is added to reassemble one or more data frames received from devices 1201/1203, and forward the new data frames to devices 1203/1201.

The relaying devices in embodiments illustrated in FIG. 6, FIG. 8, FIG. 10, and FIG. 12, may further comprise a beacon interface that is concurrently configured to send and receive beacon signals, illustrated in FIG. 7, FIG. 9, FIG. 11, and FIG. 13, respectively. In these embodiments, the beacon interface of the relaying device 702, 902, 1102, or 1302 is part of a non-cellular interface, part of a cellular interface, or an independent circuitry. In the cases where the beacon interface is the same as the non-cellular interface, the concurrent uses of the non-cellular interface are to establish and maintain one or more wireless links and perform beacon signaling. In some embodiments, the beacon signal comprises one or more of the following: a battery life, a bandwidth usage, a device type, a node-state signal, a level of mobility, a time of day, a subscription fee, a user profile, a non-cellular signal strength, a cellular signal strength, a noise level, and an interference level.

Non-Transitory Computer Readable Storage Medium

In some embodiments, the media, devices, networks, systems, and methods disclosed herein include one or more non-transitory computer readable storage media encoded with a program including instructions executable by the operating. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the media, devices, networks, systems, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Mobile Application

In some embodiments, a computer program includes a mobile application provided to a wireless device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the media, devices, networks, systems, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the media, devices, networks, systems, and methods disclosed herein include one or more databases, or use of the same. In view of the disclosure provided herein, those of skill in the art will recognize that many databases are suitable for storage and retrieval of battery life, bandwidth usages, types of devices, levels of mobility, time of day, subscription fees, user profiles, non-cellular signal strengths, cellular signal strengths, noise levels, and interference levels.

EXAMPLES

The following illustrative examples are representative of embodiments of the software applications, systems, networks, devices, and methods described herein and are not meant to be limiting in any way.

Example 1—Multi-Hop, Hybrid Network Deployment

Figure 14:
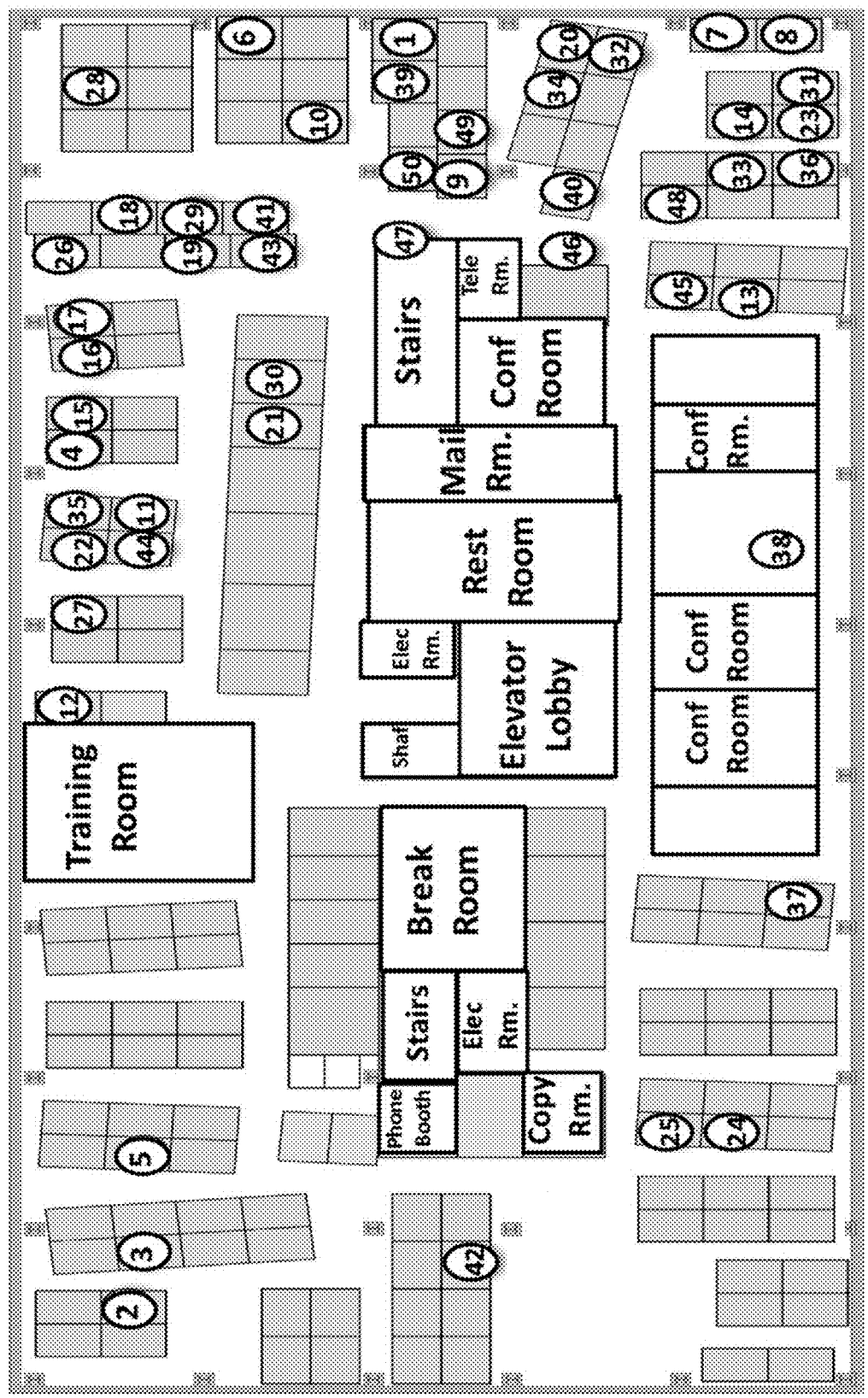
FIG. 14 shows an embodiment of a multi-hop, hybrid network deployment where wireless devices concurrently utilized Wi-Fi interfaces and cellular interfaces for wireless communications; in this case, 50 wireless devices with concurrent uses of Wi-Fi interfaces were deployed in a laboratory.

FIG. 14 shows a laboratory layout where the subject matter described herein was embodied. Referring to FIG. 14, wireless devices 1, 2, 3, . . . , 50 with built-in cellular and Wi-Fi interfaces were deployed around the laboratory. The laboratory was in the sixth floor in a high rise building. There were offices, cubicles, conference rooms, and elevators in the laboratory environment. Due to signal scattering, decay and interference, some devices had good cellular signals; furthermore, some devices had poor cellular signals or had no access to cellular base stations.

In this example, the software developed in the subject matter was distributed to all the wireless devices in the laboratory. Based on one or more of the criteria (battery life, bandwidth usage, signal strength, noise level, and interference level), the wireless devices automatically configured themselves as sink devices, relaying devices, or originating devices. The concurrent uses of Wi-Fi interfaces automatically assembled the devices into a hybrid network and executed multi-hopping protocols to carry out cellular communications. When a device had a very low signal level and had no other devices in the neighborhood for relaying its cellular communications, it was placed in the idle status.

Example 2—Performance Evaluation: Signal Strength in all Devices

This example considered the network deployment in Example 1 to evaluate the performance. Without using the subject matter described herein, many devices with very low cellular signals cannot transmit data in the cellular network. After using the subject matter described herein, these devices can conduct cellular communication by hopping to other devices. The increased cellular coverage was one of the phenomenal advantages.

The evaluation was further based on signal strength measurements. The evaluation simulated a common user behavior by sending a request to a web server in order to download a 25 MB data file, where both uplinks and downlinks were made through cellular communication channels. Within a nine hour period from 8 am to 5 pm on a test day, each wireless device repeated the process of sending the request and downloading the 25 MB file until the end of the test. Every 1 minute, the wireless devices recorded the signal strengths. Note that in the hopping system, an originating device may have no cellular signal (or a very weak cellular signal) when it is directly linked to a cellular base station; however it hopped to a sink device to share the cellular signals of the sink device, so the signal strength obtained by the originating devices can be recorded.

In the laboratory there was a second set of same wireless devices as a baseline, which was deployed in the same layout as the test set of devices. The baseline set of devices had no capability to concurrently use the Wi-Fi interface. In other words, without concurrent use of the Wi-Fi chipset, a sink device with direct links to cellular base stations was not allowed to relay cellular signals from one or more originating device. The identical evaluation procedure was replicated to the baseline set of devices.

Figure 15:
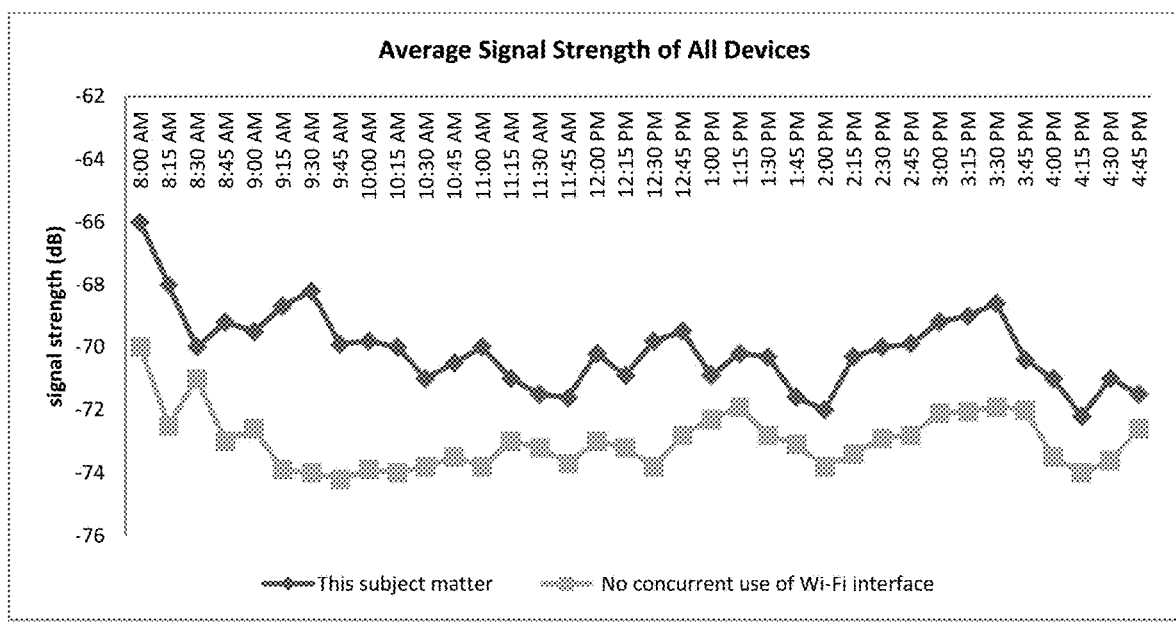
FIG. 15 shows signal strengths of the wireless devices deployed in a non-limiting example of a multi-hop, hybrid network where wireless devices concurrently utilized Wi-Fi interfaces and cellular interfaces for wireless communications; in this case, the wireless devices were automatically designated as sink devices, relaying devices, or originating devices, and all devices under concurrent uses of Wi-Fi interfaces generated better strength than the baseline wireless devices.

FIG. 15 plots the average signal strengths of all devices in the two experimental conditions. With reference to FIG. 15, the line with diamond symbols corresponds to the performance of the subject matter described herein, and the line with square symbols corresponds to the cellular communication without concurrent use of Wi-Fi interfaces. The plots showed that the subject method achieved average −70 dB signal strength across the test day, but the method without concurrent use of Wi-Fi interfaces only achieved average −73 dB signal strength.

Figure 16:
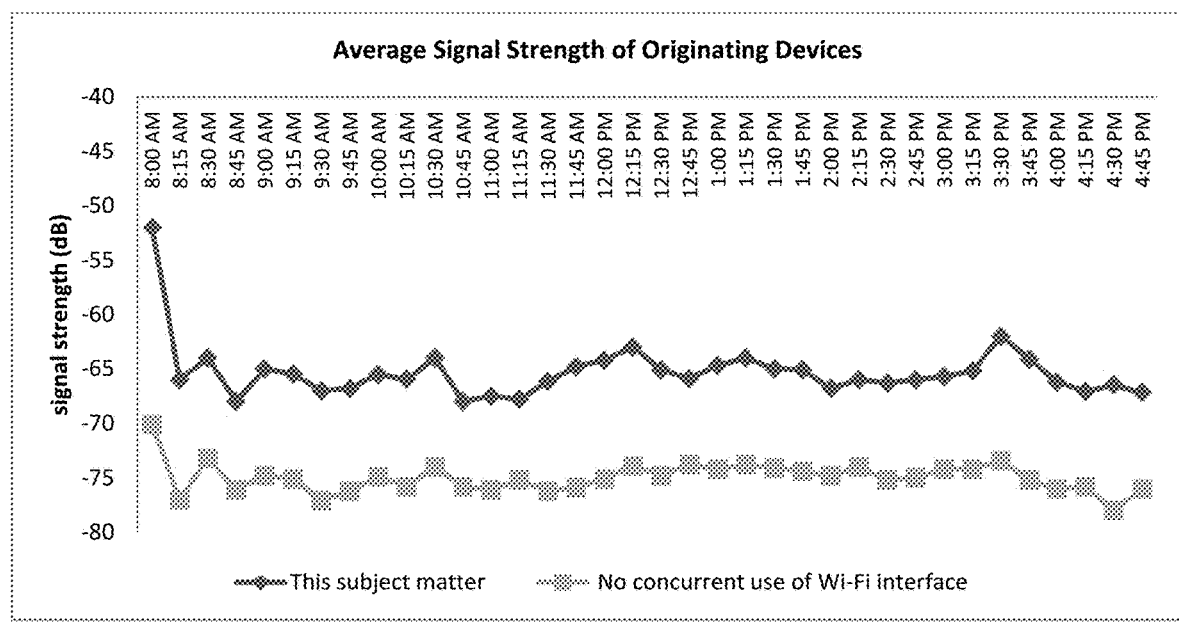
FIG. 16 shows signal strengths of the originating wireless devices deployed in a non-limiting example of a multi-hop, hybrid network where wireless devices concurrently utilized Wi-Fi interfaces and cellular interfaces for wireless communications; in this case, the wireless devices were automatically designated as sink devices, relaying devices, or originating devices, and the originating devices under concurrent uses of Wi-Fi interfaces generated better strength than the baseline originating devices.

In addition to average signal strength in all devices, the performance evaluation was further conducted on the originating devices only. The originating devices in the baseline set had no cellular signals or very low cellular signals, and they were unable to optimally establish cellular communications with cellular base stations. With concurrent use of Wi-Fi interfaces, these originating devices could acquire cellular signals through multi-hopping. The increased signal strength in the originating devices was an important indicator to quantify the merits of the subject matter. FIG. 16 displays the signal strengths in the test set and the baseline set of originating devices. The plots in FIG. 16 prove that the signal strength with concurrent use of Wi-Fi interfaces was superior to the baseline signal strength. The average signal strength based on concurrent use of Wi-Fi interfaces achieved the level of −65 dB, but the signal strength without concurrent use was only −74 dB. The average signal gain was about 9 dB.

Figure 17:
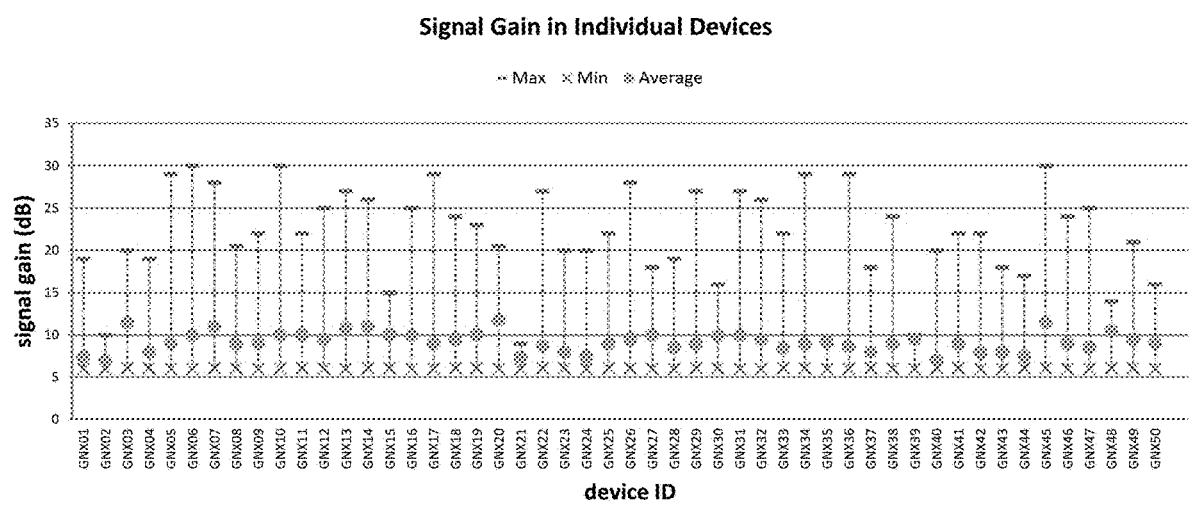
FIG. 17 is a plot of signal gains in individual wireless devices deployed in a non-limiting example of a self-configuring multi-hop, hybrid network where wireless devices concurrently utilized Wi-Fi interfaces and cellular interfaces for wireless communications; in this case, the wireless devices were automatically configured as sink devices, relaying devices, or originating devices, and average signal gain was 9 dB.

Besides measuring signal strengths, the signal gains acquired in individual wireless devices were measured. FIG. 17 shows the signal gains in individual devices over the test day, where the minima, the maxima, and the average gains are plotted. From this figure, it is easy to visualize that the 9 dB signal gains were homogeneously across all the devices.

Example 3—Channel Capacity Evaluation

Figure 18:
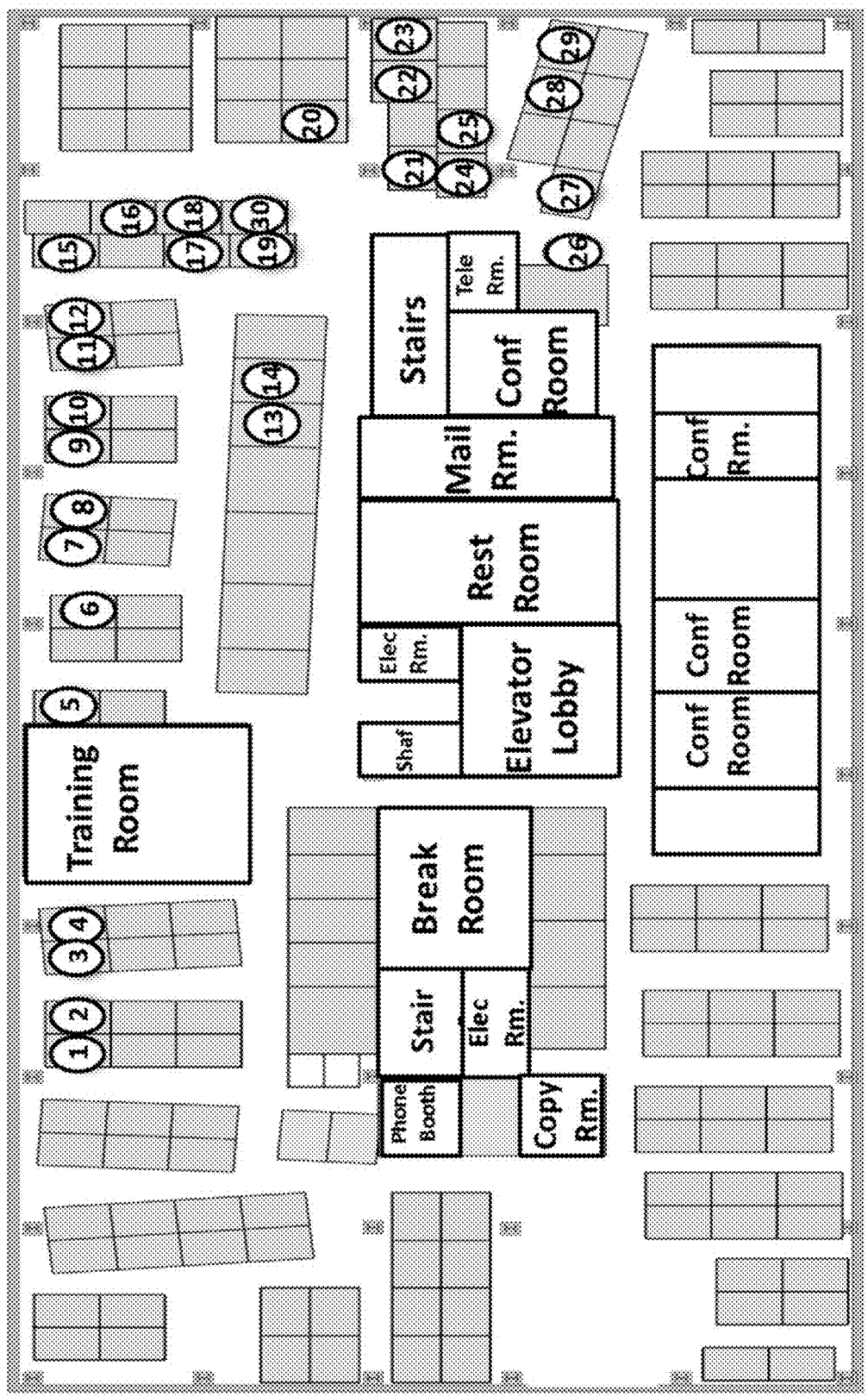
FIG. 18 shows an embodiment of a multi-hop, hybrid network deployment where wireless devices concurrently utilized Wi-Fi interfaces and cellular interfaces for wireless communications; in this case, 30 wireless devices with concurrent uses of Wi-Fi interfaces were deployed in a laboratory.
Figure 19:
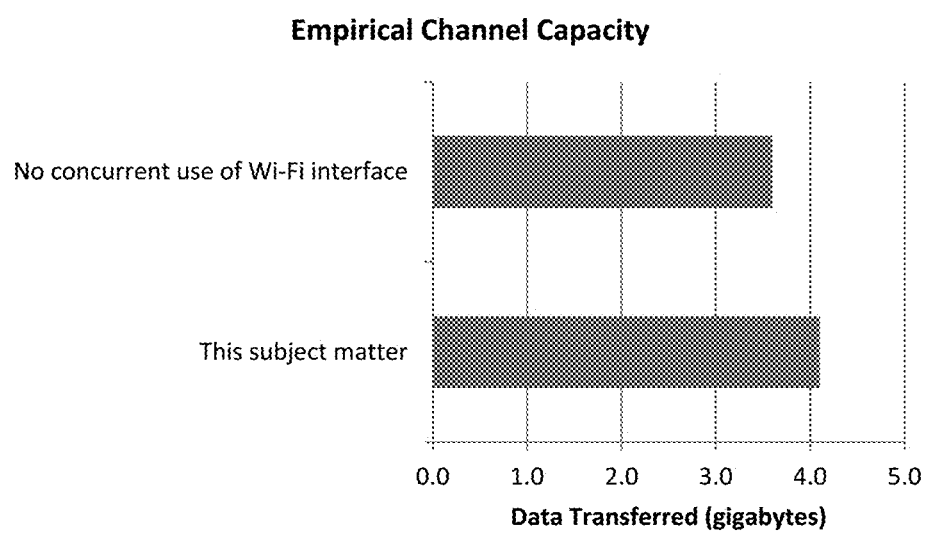
FIG. 19 plots empirical channel capacities in a non-limiting example of a multi-hop, hybrid network deployment where wireless devices concurrently utilized Wi-Fi interfaces and cellular interfaces for wireless communications; in this case, the subject matter described herein achieved a greater channel capacity than the baseline by 13.7%.

This example aimed at measuring the channel capacity for data transfer. We placed a set of 30 mobile phones in the laboratory, as shown in the layout in FIG. 18. The subject software was installed in the mobile phones to concurrently utilize the Wi-Fi interfaces for cellular communication. Each mobile phone was tested for a period of 30 minutes. During the test period, the mobile phone repeated the following sequence of tasks: randomly delaying 5-35 seconds, downloading a 5 MB file, randomly delaying 5-20 seconds, and uploading the file. Similar to previous examples, a second set of mobile phones without concurrent uses of Wi-Fi interfaces were deployed as baseline. FIG. 19 displays the measurements of empirical channel capacities of wireless device. This subject matter achieved 4.1 GB data capacity, greater than the baseline by 13.7%.

Figure 20:
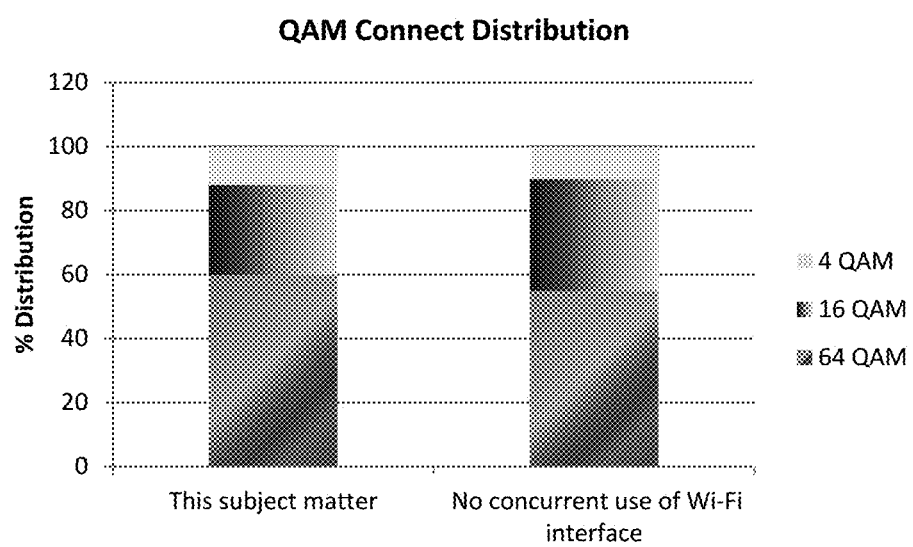
FIG. 20 plots percentage of modulation schemes used in a non-limiting example of a multi-hop, hybrid network deployment where wireless devices concurrently utilized Wi-Fi interfaces and cellular interfaces for wireless communications; in this case, a higher level of modulation scheme (64-QAM) was automatically selected more frequently in the subject matter to achieve a high data transmission rate.

In addition to channel capacity, another evaluation was to measure the data rate by modulation schemes. We considered the number of phones using a higher degree of quadrature amplitude modulation (QAM). Based on signal strength, noise level and interference level, the phones were able to adapt themselves to use one of the following modulation schemes: 64-QAM, 16-QAM, and 4-QAM. Using a higher degree of modulation implied that the signal quality is better to transmit data at a higher rate. FIG. 20 shows that this subject matter was able to involve more phones using 64-QAM. This experiment demonstrates higher data rates were achievable by the subject method.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. Non-transitory computer-readable storage media encoded with a computer program including instructions when executed by a processor of a wireless device to create an application for operating the wireless device in a hybrid, multi-hopping wireless communication network, the application comprising:
   a) a first software module automatically and dynamically configuring common resources of a non-cellular interface to simultaneously create a first non-cellular virtual interface and a second non-cellular virtual interface for relaying a cellular communication between a downstream wireless device and an upstream wireless device, wherein configuring the common resources of the non-cellular interface comprises controlling and scheduling the common resources to simultaneously execute different tasks of the first non-cellular virtual interface and the second non-cellular virtual interface, wherein the different tasks include: establishing by the first non-cellular virtual interface, without intermediary device, a first wireless link between the first non-cellular virtual interface and the downstream wireless device by sending a hopping request, establishing by the second non-cellular virtual interface, without intermediary device, a second wireless link between the second non-cellular virtual interface and the upstream wireless device by sending a hopping request, and relaying the cellular communication which comprises:
   1) establishing and maintaining, by the first non-cellular virtual interface, the first wireless link between the first non-cellular virtual interface and the downstream wireless device using a first protocol;
   2) establishing and maintaining, by the second non-cellular virtual interface, the second wireless link between the second non-cellular virtual interface and the upstream wireless device using a second protocol different from the first protocol, wherein the first protocol and the second protocol are different non-cellular wireless protocols determined based on the first virtual non-cellular virtual interface and the second virtual non-cellular virtual interface, and wherein the first protocol and the second protocol are different data link layer protocols;
   3) establishing and maintaining an internal transfer between the first and the second wireless links, wherein the internal transfer comprises:
   i) reassembling one or more data frames received from the downstream wireless device into a format defined by the second protocol used in the second wireless link,
   ii) reassembling one or more data frames received from the upstream wireless device into a format defined by the first protocol used in the first wireless link, and
   iii) forwarding one or more reassembled data frames to the downstream wireless device or the upstream wireless device; and
   4) requesting, by the second non-cellular virtual interface via the second wireless link between the second non-cellular virtual interface and the upstream wireless device, the upstream wireless device to establish and maintain a cellular communication between the upstream wireless device and a cellular base station; and
   b) a second software module configuring a beacon interface for transmitting or receiving one or more beacon signals.

2. The media of claim 1, wherein the common resources of the non-cellular interface are for the purpose of non-cellular communication and are automatically configured based on one or more of: a battery life, a bandwidth usage, a device type, a node-state signal, a level of mobility, a time of day, a subscription fee, a non-cellular signal strength, a cellular signal strength, a noise level, and an interference level.

3. The media of claim 1, wherein the beacon interface is part of the non-cellular interface, and wherein the cellular communication between the upstream wireless device and the cellular base station is established based at least in part on the one or more beacon signals.

4. The media of claim 1, wherein the beacon interface is part of a cellular interface.

5. The media of claim 1, wherein the one or more beacon signals comprise one or more of: a battery life, a bandwidth usage, a device type, a node-state signal, a level of mobility, a time of day, a subscription fee, a user profile, a non-cellular signal strength, a cellular signal strength, a noise level, and an interference level.

6. The media of claim 1, wherein the application further comprises a third software module concurrently configuring the non-cellular interface for establishing and maintaining a third wireless link between the non-cellular interface and a non-cellular access point.

7. A method implemented by a device, the method comprising:
   a) automatically and dynamically configuring common resources of a non-cellular interface to simultaneously create a first non-cellular virtual interface and a second non-cellular virtual interface for relaying a cellular communication between a downstream wireless device and an upstream wireless device, wherein configuring the common resources of the non-cellular interface comprises controlling and scheduling the common resources to simultaneously execute different tasks of the first non-cellular virtual interface and the second non-cellular virtual interface,
   wherein the different tasks include: establishing by the first non-cellular virtual interface, without intermediary device, a first wireless link between the first non-cellular virtual interface and the downstream wireless device by sending a hopping request, establishing by the second non-cellular virtual interface, without intermediary device, a second wireless link between the second non-cellular virtual interface and the upstream wireless device by sending a hopping request, and relaying the cellular communication which comprises:
   1) establishing and maintaining, by the first non-cellular virtual interface, the first wireless link between the first non-cellular virtual interface and the downstream wireless device using a first protocol;
   2) establishing and maintaining, by the second non-cellular virtual interface, the second wireless link between the second non-cellular virtual interface and the upstream wireless device using a second protocol different from the first protocol, wherein the first protocol and the second protocol are different non-cellular wireless protocols determined based on the first virtual non-cellular virtual interface and the second virtual non-cellular virtual interface, and wherein the first protocol and the second protocol are different data link layer protocols;
3) establishing and maintaining an internal transfer between the first and the second wireless links, wherein the internal transfer comprises:
   i) reassembling one or more data frames received from the downstream wireless device into a format defined by the second protocol used in the second wireless link,
   ii) reassembling one or more data frames received from the upstream wireless device into a format defined by the first protocol used in the first wireless link, and
   iii) forwarding one or more reassembled data frames to the downstream wireless device or the upstream wireless device; and
4) requesting, by the second non-cellular virtual interface via the second wireless link between the second non-cellular virtual interface and the upstream wireless device, the upstream wireless device to establish and maintain a cellular communication between the upstream wireless device and a cellular base station; and
b) configuring a beacon interface for transmitting or receiving one or more beacon signals.

8. The method of claim 7, wherein the common resources of the non-cellular interface are for the purpose of non-cellular communication and are automatically configured based on one or more of: a battery life, a bandwidth usage, a device type, a node-state signal, a level of mobility, a time of day, a subscription fee, a user profile, a non-cellular signal strength, a cellular signal strength, a noise level, and an interference level.

9. The method of claim 7, wherein the beacon interface is part of the non-cellular interface, and wherein the cellular communication between the upstream wireless device and the cellular base station is established based at least in part on the one or more beacon signals.

10. The method of claim 7, wherein the beacon interface is part of a cellular interface.

11. The method of claim 7, wherein the one or more beacon signals comprise one or more of: a battery life, a bandwidth usage, a device type, a node-state signal, a level of mobility, a time of day, a subscription fee, a user profile, a non-cellular signal strength, a cellular signal strength, a noise level, and an interference level.

12. The method of claim 7, further comprising concurrently configuring the non-cellular interface for establishing and maintaining a third wireless link between the non-cellular interface and a non-cellular access point.

13. A communication system operating in a hybrid, multi-hopping wireless communication network, the system comprising a downstream device, an upstream device, and a wireless device including a processor, a non-cellular interface, a beacon interface and a computer program including instructions when executed by the processor to create an application, the application comprising:
a) a first software module automatically and dynamically configuring common resources of the non-cellular interface to simultaneously create a first non-cellular virtual interface and a second non-cellular virtual interface for relaying a cellular communication between the downstream wireless device and the upstream wireless device, wherein configuring the common resources of the non-cellular interface comprises controlling and scheduling the common resources to simultaneously execute different tasks of the first non-cellular virtual interface and the second non-cellular virtual interface, wherein the different tasks include: establishing by the first non-cellular virtual interface, without intermediary device, a first wireless link between the first non-cellular virtual interface and the downstream wireless device by sending a hopping request, establishing by the second non-cellular virtual interface, without intermediary device, a second wireless link between the second non-cellular virtual interface and the upstream wireless by sending a hopping request, and relaying the cellular communication which comprises:
   1) establishing and maintaining, by the first non-cellular virtual interface, the first wireless link between the first non-cellular virtual interface and the downstream wireless device using a first protocol;
   2) establishing and maintaining, by the second non-cellular virtual interface, the second wireless link between the second non-cellular virtual interface and the upstream wireless device using a second protocol different from the first protocol, wherein the first protocol and the second protocol are different non-cellular wireless protocols determined based on the first virtual non-cellular virtual interface and the second virtual non-cellular virtual interface, and wherein the first protocol and the second protocol are different data link layer protocols;
   3) establishing and maintaining an internal transfer between the first and the second wireless links, wherein the internal transfer comprises:
      i) reassembling one or more data frames received from the downstream wireless device into a format defined by the second protocol used in the second wireless link,
      ii) reassembling one or more data frames received from the upstream wireless device into a format defined by the first protocol used in the first wireless link, and
      iii) forwarding one or more reassembled data frames to the downstream wireless device or the upstream wireless device; and
   4) requesting, by the second non-cellular virtual interface via the second wireless link between the second non-cellular virtual interface and the upstream wireless device, the upstream wireless device to establish and maintain a cellular communication between the upstream wireless device and a cellular base station; and
b) a second software module configuring the beacon interface for transmitting or receiving one or more beacon signals.

14. The communication system of claim 13, wherein the common resources of the non-cellular interface are for the purpose of non-cellular communication and are automatically configured based on one or more of: a battery life, a bandwidth usage, a device type, a node-state signal, a level of mobility, a time of day, a subscription fee, a user profile, a non-cellular signal strength, a cellular signal strength, a noise level, and an interference level.

15. The communication system of claim 13, wherein the beacon interface is part of the non-cellular interface, and wherein the cellular communication between the upstream wireless device and the cellular base station is established based at least in part on the one or more beacon signals.

16. The communication system of claim 13, wherein the beacon interface is part of a cellular interface.

17. The communication system of claim 13, wherein the one or more beacon signals comprise one or more of: a battery life, a bandwidth usage, a device type, a node-state signal, a level of mobility, a time of day, a subscription fee, a user profile, a non-cellular signal strength, a cellular signal strength, a noise level, and an interference level.

18. The communication system of claim 13, wherein the application further comprises a third software module concurrently configuring the non-cellular interface for establishing and maintaining a third wireless link between the non-cellular interface and a non-cellular access point.

* * * * *